US011275956B2

(12) United States Patent
Machii et al.

(10) Patent No.: US 11,275,956 B2
(45) Date of Patent: Mar. 15, 2022

(54) DEMARCATION LINE RECOGNITION DEVICE

(71) Applicant: Clarion Co., Ltd., Saitama (JP)

(72) Inventors: Kimiyoshi Machii, Tokyo (JP); Takehito Ogata, Tokyo (JP); Junya Nakamura, Saitama (JP); Naoki Shimizu, Saitama (JP); Ayano Enomoto, Saitama (JP)

(73) Assignee: CLARION CO., LTD., Saitama (JP)

( * ) Notice: Subject to any disclaimer, the term of this patent is extended or adjusted under 35 U.S.C. 154(b) by 76 days.

(21) Appl. No.: 16/652,003

(22) PCT Filed: Sep. 28, 2018

(86) PCT No.: PCT/JP2018/036194
§ 371 (c)(1),
(2) Date: Mar. 27, 2020

(87) PCT Pub. No.: WO2019/065945
PCT Pub. Date: Apr. 4, 2019

(65) Prior Publication Data
US 2020/0265246 A1    Aug. 20, 2020

(30) Foreign Application Priority Data

Sep. 29, 2017  (JP) .............................. JP2017-192242

(51) Int. Cl.
G06K 9/00          (2006.01)
G06T 7/143         (2017.01)
(Continued)

(52) U.S. Cl.
CPC ....... *G06K 9/00798* (2013.01); *G06K 9/4604* (2013.01); *G06K 9/525* (2013.01);
(Continued)

(58) Field of Classification Search
CPC .. G06K 9/00798; G06K 9/4604; G06K 9/525; G06K 9/6278; G06K 9/4652;
(Continued)

(56) References Cited

U.S. PATENT DOCUMENTS

2016/0026879 A1    1/2016  Maeda et al.
2016/0098605 A1    4/2016  Okada et al.
(Continued)

FOREIGN PATENT DOCUMENTS

CN    104899858 A  *  9/2015 ............... G06T 7/00
EP    1 862 972 A1    12/2007
(Continued)

OTHER PUBLICATIONS

Lin, Q., Han, Y. and Hahn, H., May 2010. Real-time lane departure detection based on extended edge-linking algorithm. In 2010 Second International Conference on Computer Research and Development (pp. 725-730). IEEE.*
(Continued)

*Primary Examiner* — Zhitong Chen
(74) *Attorney, Agent, or Firm* — Lewis Roca Rothgerber Christie LLP

(57) ABSTRACT

The present invention addresses the problem of enabling an accurate determination of line type using a plurality of cameras. A demarcation line recognition device of the present invention includes a plurality of cameras (101); a line type determination unit (210) that senses demarcation line candidates from respective images obtained by the plurality of cameras and determines line types of the sensed demarcation line candidates; a demarcation line position calculation unit that calculates the positions of the sensed demarcation line candidates; a reliability level calculation unit that computes a reliability level of each demarcation line candidate by using positional relationships between the sensed
(Continued)

demarcation line candidates; a probability computation unit (204) to which line types of demarcation line candidates for which the reliability level is equal to or greater than a threshold value are input and that determines the probability of each line type; and a line type decision unit (205) that finally decides the line types of the demarcation lines on the basis of the results of the probability computation unit.

9 Claims, 23 Drawing Sheets

(51) Int. Cl.
*G06T 7/277* (2017.01)
*G06K 9/46* (2006.01)
*G06K 9/52* (2006.01)
*G06K 9/62* (2006.01)

(52) U.S. Cl.
CPC ............ *G06K 9/6278* (2013.01); *G06T 7/143* (2017.01); *G06T 7/277* (2017.01); *G06T 2207/30256* (2013.01)

(58) Field of Classification Search
CPC ............ G06T 7/143; G06T 7/277; G06T 2207/30256; G06T 7/20; G06T 7/00; G06T 7/60; B62D 15/025
See application file for complete search history.

(56) References Cited

U.S. PATENT DOCUMENTS

| | | | | |
|---|---|---|---|---|
| 2018/0181819 A1* | 6/2018 | Kawano | .................... | B60R 1/00 |
| 2020/0240806 A1* | 7/2020 | Daikoku | ................... | G08G 1/04 |

FOREIGN PATENT DOCUMENTS

| | | |
|---|---|---|
| EP | 2 065 835 A2 | 6/2009 |
| EP | 2 924 614 A1 | 9/2015 |
| JP | 2008-3253 | 1/2008 |
| JP | 2013-12044 | 1/2013 |
| JP | 2014-27539 | 2/2014 |
| JP | 2016-71817 | 5/2016 |
| JP | 2017-010464 A | 1/2017 |
| WO | WO 2017/047365 A1 | 3/2017 |

OTHER PUBLICATIONS

International Search Report with Written Opinion, corresponding to PCT/JP2018/036194, dated Dec. 11, 2018, 7 pages.

Extended European Search Report dated May 3, 2021 for corresponding European Application No. 18863333.3 (11 pages).

* cited by examiner

| | ① | ② | ③ | ④ | ⑤ | ⑥ |
|---|---|---|---|---|---|---|
| ① | — | -40 | 28 | 60 | -40 | 59 |
| ② | -40 | — | -42 | -10 | -110 | -11 |
| ③ | 28 | -42 | — | 59 | -38 | 59 |
| ④ | 60 | -10 | 59 | — | -70 | 29 |
| ⑤ | -40 | -110 | -38 | -70 | — | -39 |
| ⑥ | 59 | -11 | 59 | 29 | -39 | — |

| ROAD TYPE | WIDTH (m) |
|---|---|
| NATIONAL EXPRESSWAY | 3.75 |
| MOTORWAY | 3.25 |
| NATIONAL ROAD | 3.00 |
| PREFECTURAL ROAD | 2.75 |
| MUNICIPAL ROAD | 2.75 |

FIG.14
| | ① | ② | ③ | ④ | ⑤ | ⑥ | 計 |
|---|---|---|---|---|---|---|---|
| ① | — | -40 | 28 | 60 | -40 | 59 | 67 |
| ② | -40 | — | -42 | -10 | -110 | -11 | -213 |
| ③ | 28 | -42 | — | 59 | -38 | 59 | 66 |
| ④ | 60 | -10 | 59 | — | -70 | 29 | 68 |
| ⑤ | -40 | -110 | -38 | -70 | — | -39 | -297 |
| ⑥ | 59 | -11 | 59 | 29 | -39 | — | 97 |
— 1401
| | ① | ② | ③ | ④ | ⑤ | ⑥ | 計 |
|---|---|---|---|---|---|---|---|
| ① | — | -40 | 28 | 60 | -40 | 59 | 107 |
| ② | -40 | — | -42 | -10 | -110 | -11 | -103 |
| ③ | 28 | -42 | — | 59 | -38 | 59 | 104 |
| ④ | 60 | -10 | 59 | — | -70 | 29 | 138 |
| ⑤ | -40 | -110 | -38 | -70 | — | -39 | -297 |
| ⑥ | 59 | -11 | 59 | 29 | -39 | — | 136 |
— 1402
| | ① | ② | ③ | ④ | ⑤ | ⑥ | 計 |
|---|---|---|---|---|---|---|---|
| ① | — | -40 | 28 | 60 | -40 | 59 | 147 |
| ② | -40 | — | -42 | -10 | -110 | -11 | -103 |
| ③ | 28 | -42 | — | 59 | -38 | 59 | 146 |
| ④ | 60 | -10 | 59 | — | -70 | 29 | 148 |
| ⑤ | -40 | -110 | -38 | -70 | — | -39 | -297 |
| ⑥ | 59 | -11 | 59 | 29 | -39 | — | 147 |
— 1403

DEMARCATION LINE RECOGNITION DEVICE

CROSS-REFERENCE TO RELATED APPLICATION(S)

This application is a U.S. National Phase Patent Application and claims priority to and the benefit of International Application Number PCT/JP2018/036194, filed on Sep. 28, 2018, which claims priority of Japanese Patent Application Number 2017-192242, filed on Sep. 29, 2017, the entire contents of all of which are incorporated herein by reference.

TECHNICAL FIELD

The present invention relates to a device for recognizing road surface markings in a vehicle travel environment.

BACKGROUND ART

PTL 1 discloses a road shape acquiring device that partitions, into grids, a link plane generated on the basis of a link constituting a road and acquires a road shape from the grids for which there is a predetermined or higher probability of white line presence, the road shape acquiring device comprising: a map data storage unit that stores link information of the road; a white line presence probability storage unit that stores, for each of the grids, an updated white line presence probability or a white line presence probability of an initial value, a position detection unit that detects a vehicle position; a white line detection unit that detects a white line of the road; and a white line presence probability configuration unit that applies, to a Bayesian updating formula, a white line presence probability of a grid of a predetermined area from among the grids corresponding to the detected white line and a white line presence probability stored in the white line presence probability storage unit, and that updates the white line presence probability stored in the white line presence probability storage unit.

CITATION LIST

Patent Literature

PTL 1: Japanese Unexamined Patent Application Publication No. 2008-3253
PTL 2: Japanese Unexamined Patent Application Publication No. 2014-027539

SUMMARY OF THE INVENTION

Problems to be Solved by the Invention

In PTL 1, the probability of a white line being present is determined by stochastically processing recognition results obtained by a single camera. However, in cases where results obtained by a single camera are stochastically processed, if the same results continue, the probability thereof continues to rise, and hence the line type and white line position will likely continue to be erroneous. Furthermore, a unit for correcting continually erroneous results is not provided.

However, this problem is not solved simply by retaining a plurality of cameras. If a plurality of cameras are retained, because the perspectives of the images differ due to the camera installation positions and angles, the results of all the cameras are not necessarily always reliable. It is therefore necessary to determine how reliable cameras are and to select a suitable camera.

The present invention was conceived in view of the foregoing, and the purpose of the present invention is to provide a demarcation line recognition device that enables an accurate determination of the line type of a demarcation line demarcating a lane.

Means to Solve the Problems

A demarcation line recognition device according to the present invention that solves the foregoing problems comprises: a plurality of cameras; a line type determination unit that senses demarcation line candidates from respective images obtained by the plurality of cameras and determines line types of the sensed demarcation line candidates; a demarcation line position calculation unit that calculates the positions of the sensed demarcation line candidates; a reliability level calculation unit that computes a reliability level of each demarcation line candidate by using positional relationships between the sensed demarcation line candidates; a probability computation unit to which line types of demarcation line candidates for which the reliability level is equal to or greater than a threshold value are input and that determines the probability of each line type; and a line type decision unit that finally decides the line types of the demarcation lines on the basis of the results of the probability computation unit.

Advantageous Effects of the Invention

The present invention enables an accurate determination of line type using a plurality of cameras. Further characteristics pertaining to the present invention will become apparent from the detailed description of the present specification and the accompanying drawings. Problems, configurations and effects other than those described hereinabove will become more apparent from the description of the embodiments hereinbelow.

BRIEF DESCRIPTION OF DRAWINGS

FIG. 11 is an example of scoring results.
FIG. 12 illustrates the relationships between road types and road widths corresponding to the road types.

FIG. 14 is an example of reliability level determination.

DESCRIPTION OF EMBODIMENTS

Figure 1:
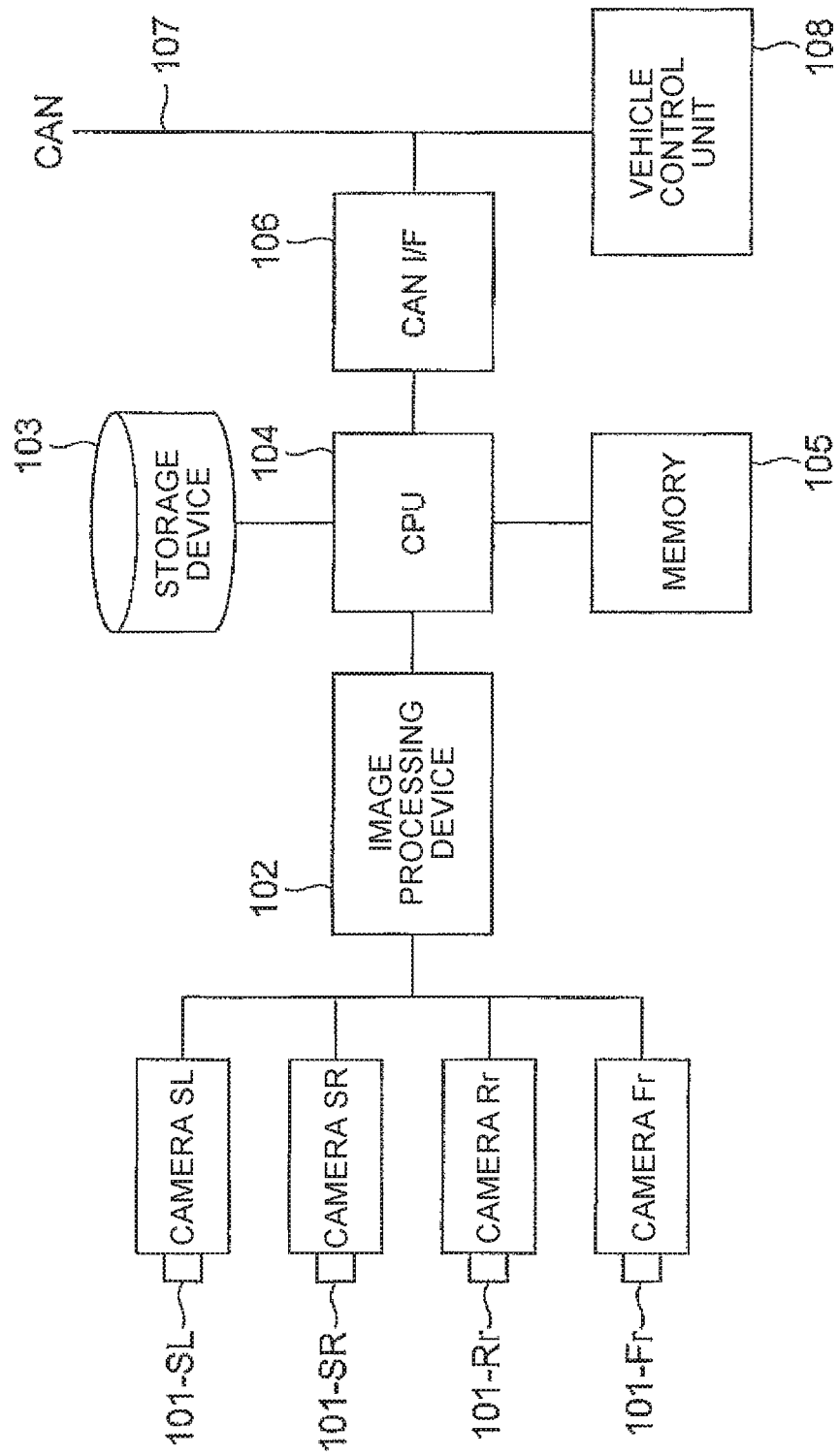
FIG. 1 is a diagram illustrating an example of a device configuration.

FIG. 1 is a diagram illustrating a configuration example of the device according to the present invention. The demarcation line recognition device according to the present embodiment is installed in an automobile body, and recognizes demarcation lines, such as white lines constituting a lane, on the basis of images captured by a camera. The demarcation line recognition device is embodied through a collaboration between hardware installed in the vehicle and software that controls the hardware.

The demarcation line recognition device comprises a front camera 101-Fr for monitoring the front of the vehicle, a rear camera 101-Rr for monitoring the rear thereof, a left side camera 101-SL for monitoring the left side of the vehicle, a right side camera 101-SR for monitoring the right side of the vehicle, an image processing device 102 that processes camera images of the cameras, and a storage device 103 for storing map information and the like.

A CPU 104 uses the results of processing by the image processing device 102 to store, in a memory 105, information of an own lane of the vehicle and of white lines constituting adjacent lanes. The CPU 104 then sends this information to a vehicle control unit 108 so as to pass through a CAN bus 107 via a CAN I/F 106.

Figure 2:
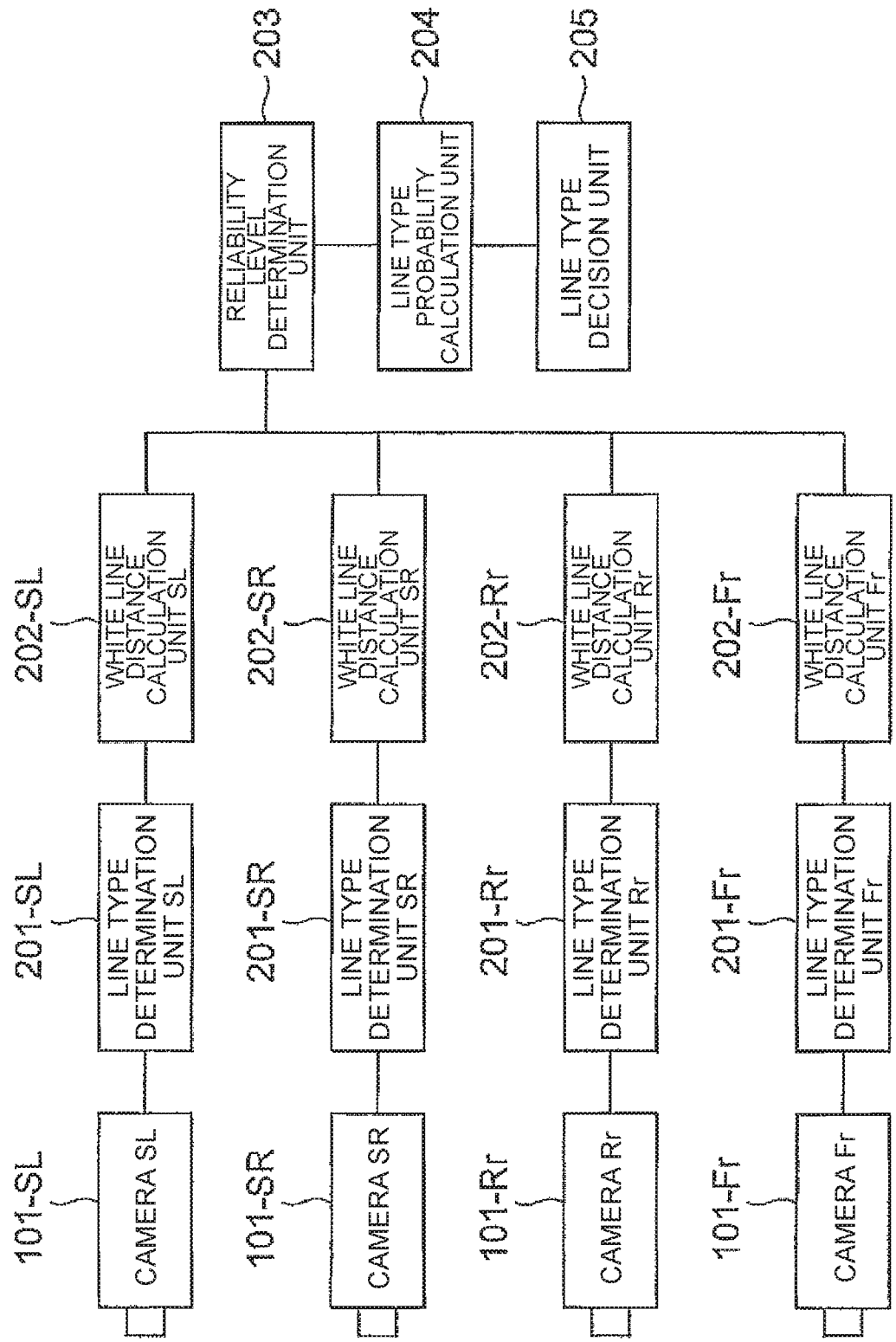
FIG. 2 is a diagram illustrating an example of a software configuration.

FIG. 2 is a diagram illustrating an example of a software configuration according to the present invention. A line type determination unit 201 and a white line distance calculation unit 202 are provided for each camera so as to correspond to each camera 101.

The line type determination unit 201 is provided in the image processing device 102 and senses white lines on the basis of feature points which are extracted from images captured by the cameras 101. The line type is then determined on the basis of the results.

As a technique for extracting the feature points, there exists a technique that uses boundary edges corresponding to black luminance values and white luminance values, for example. If the distance between the boundary edges is equivalent to a white line width, a feature point is assumed. Although various other techniques may be considered, it makes no difference which technique is used in the present embodiment. Furthermore, the line type determination unit extracts a straight line on the basis of information of an extracted feature point. This method will be described subsequently.

The white line distance calculation unit 202 calculates the distance from the vehicle to each white line candidate. This calculation is enabled by converting feature point coordinates of white line candidates to world coordinates. This calculation will also be described subsequently.

A reliability level determination unit 203 determines whether to adopt a white line candidate sensed by any camera. It is determined whether each camera is contaminated and whether each camera is sensing white lines erroneously, and a suitable candidate is selected.

A line type probability calculation unit 204 accepts an input of a line type for each white line candidate and processes the inputs stochastically to calculate a probability for each line type (probability computation unit). A line type decision unit 205 decides a final line type on the basis of the probability of each line type calculated by the line type probability calculation unit 204. The line type probability calculation unit 204 and the line type decision unit 205 will be described subsequently.

Figure 3:
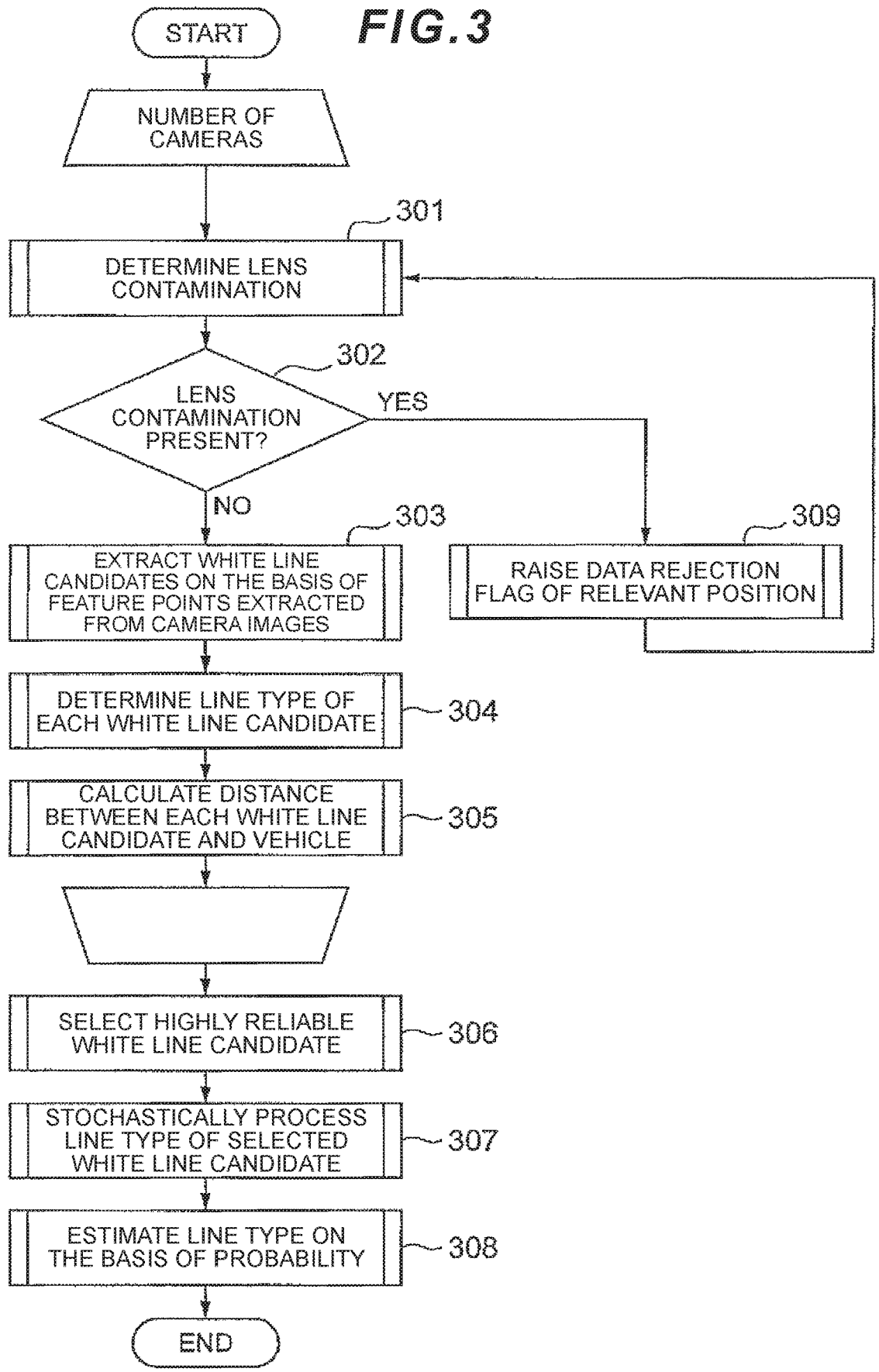
FIG. 3 is a diagram providing an overview of the flow of processing.

FIG. 3 is a diagram providing an overview of the flow of processing according to the present invention. This is processing equivalent to one frame of an image. First, there is repetitive processing that corresponds to the number of cameras. In an initial step 301, camera lens contamination is determined. Well-known methods may be applied for this technique, for example, a method such as that disclosed in Japanese Unexamined Patent Publication No. 2014-027539 (PTL 2) and so forth may be applied, and a detailed description of this technique is omitted here. The degree of lens contamination is then evaluated in step 302. If there is lens contamination, a rejection flag for a white line that should have been captured by the camera is raised (step 309).

In other words, it is decided that the camera will not be used, and the processing moves to processing of the next camera.

Figure 5:
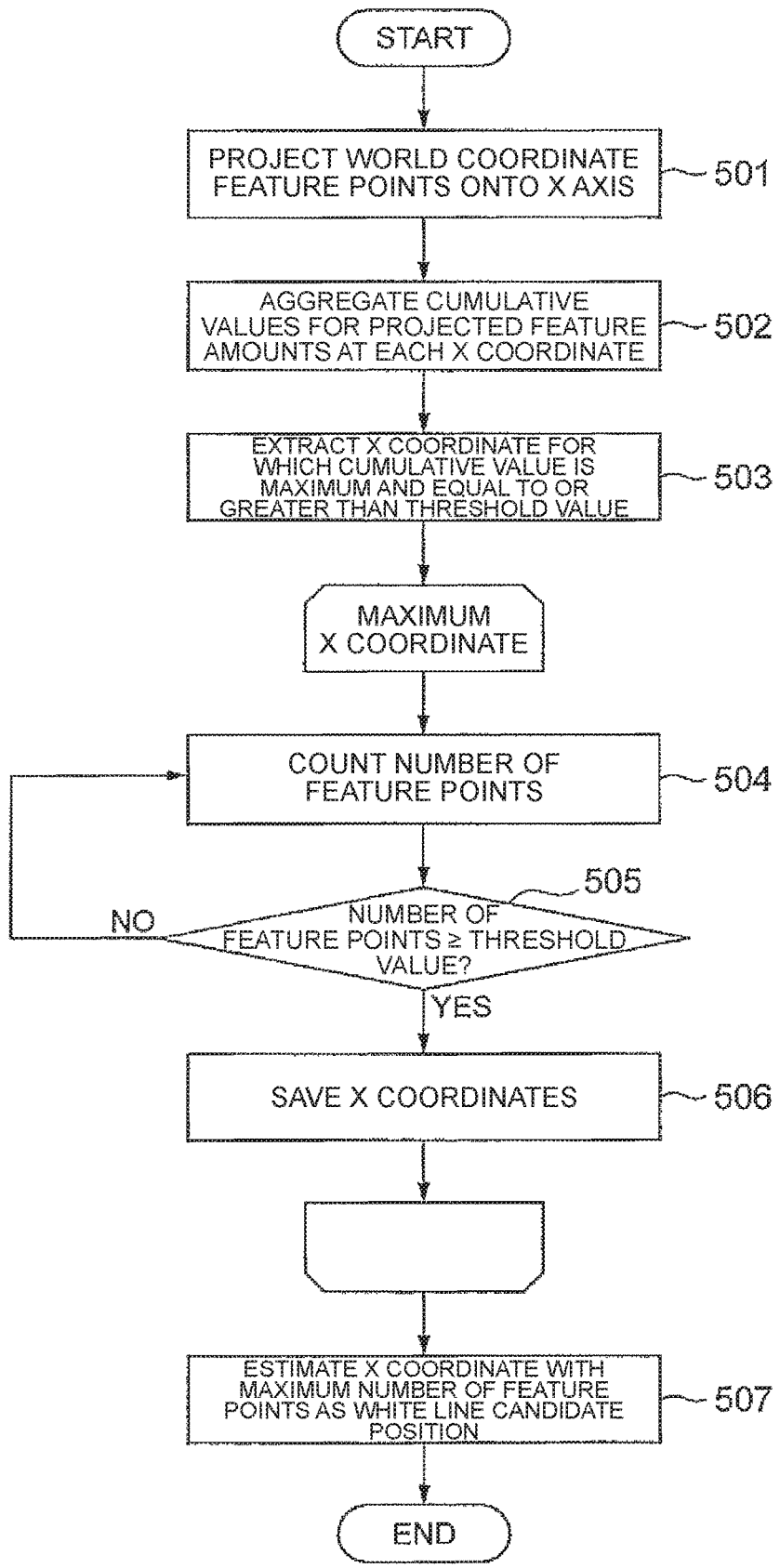
FIG. 5 is a flowchart illustrating white line candidate extraction processing.

When there is no lens contamination, the processing moves to step 303 and subsequent steps. In step 303, feature amounts are extracted from each camera image and white line candidates are sensed. Thereafter, in step 304, the line type of each white line candidate is determined. Techniques for determining line types include a technique wherein information on the presence or absence of white lines is accumulated over a plurality of frames and the periodicity of the information is used to distinguish between a solid line and a broken line, but it makes no difference which technique is used in the present embodiment. The processing from step 301 to step 304 corresponds to the processing by the line type determination unit 201. Thereafter, in step 305, the distance between each white line candidate and the vehicle is calculated. This corresponds to the processing by the white line distance calculation unit 202. The white line candidate position determined in step 507 of the white line sensing flow in FIG. 5 is used for the processing of step 305. The distance from the vehicle to the white line candidate is a value obtained by subtracting the vehicle width/2 from the white line candidate position.

Steps 301 to 305 is processing for each camera. Subsequent processing is processing in which the results of the respective cameras are used. In step 306, a highly reliable white line candidate is selected. This corresponds to the processing of the reliability level determination unit 203. Thereafter, in step 307, the line type of the selected white line candidate is stochastically processed. For the stochastic processing, applying a theory based on Bayes' statistics or the like, for example, is suitable, and probabilities are determined for all the line types taken as recognition targets.

This corresponds to the processing by the line type probability calculation unit 204. Finally, in step 308, the line types are finally decided on the basis of the probabilities thus determined. Here, the line type for which the probability is maximum may be selected, or similar. This corresponds to the processing by the line type decision unit 205.

Figure 4:
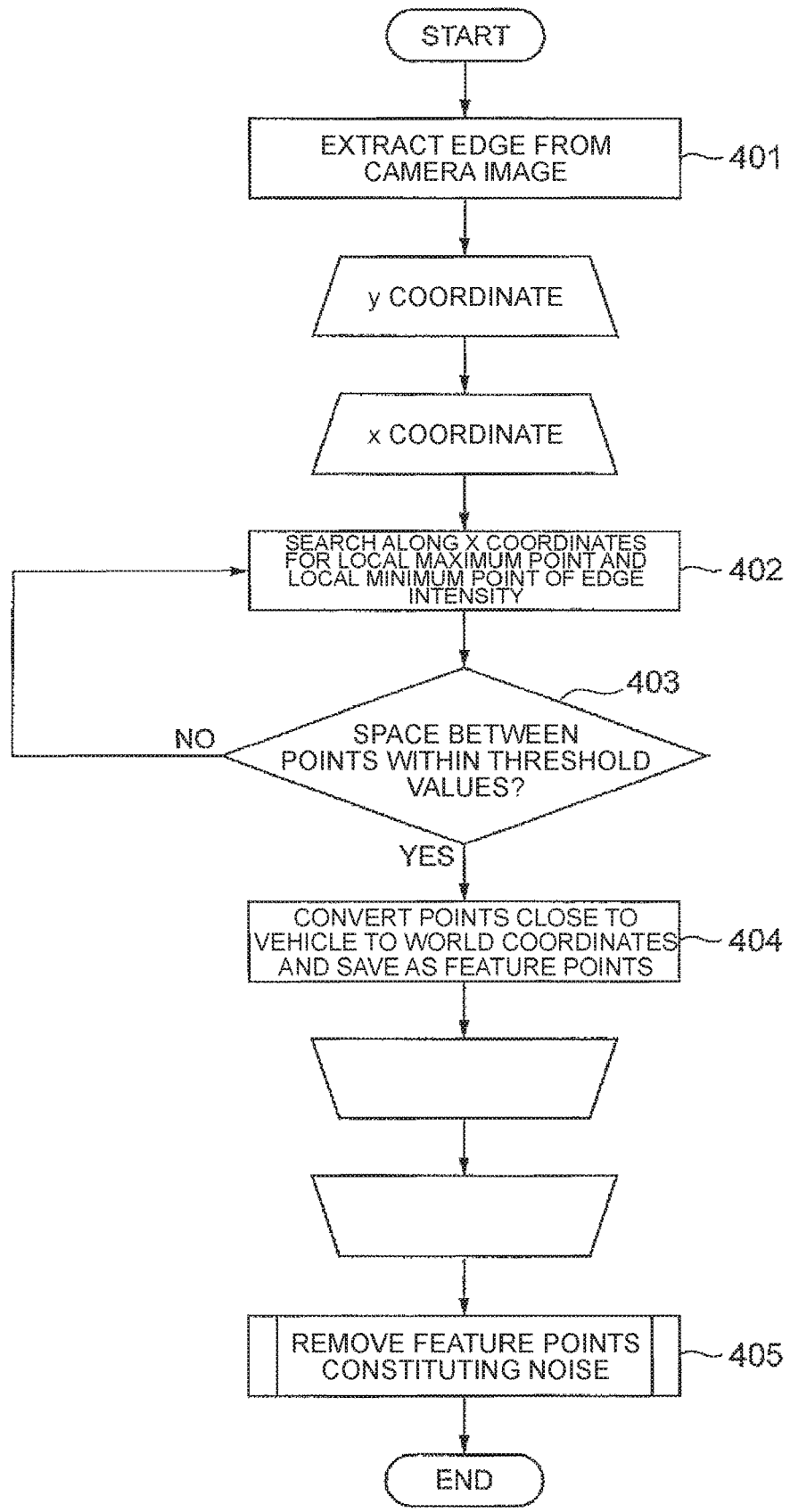
FIG. 4 is a flowchart illustrating feature point extraction processing.

FIG. 4 is a flowchart illustrating feature point extraction processing in the line type determination unit 201. Here, the description is provided by assuming a front camera and a rear camera.

First, in step 401, processing is performed to extract edges from an image which has been input. As the edge extraction technique, a technique in which edge images are created by using a differential filter such as a Sobel filter, for example, is suitable. Alternatively, the whole image may be categorized according to brightness into a road surface, white lines, and other items, and an edge may be extracted by regarding a boundary between the categories as an edge. Thereafter, the edge intensity for each extracted edge is checked and a search for edges at which the intensity is a local maximum and a local minimum is carried out (step 402).

That is, a search for an edge that runs from left to right (for which the X coordinate changes from smaller to larger) is first performed at each Y coordinate, and an edge of a positive edge intensity (a boundary for which the brightness goes from a low brightness to a high brightness) is sought. A rightward edge search is also performed and an edge at which the edge intensity changes to a negative edge intensity (a boundary for which the brightness goes from a high brightness to a low brightness) is sought. It is determined whether or not this X coordinate differential falls within a range of threshold values (step 403), and if the X coordinate differential does indeed fall within the threshold values, edge coordinates closer to the vehicle are regarded as feature points, and converted to world coordinates and saved (step 404). Thus, feature points such as those where only an edge is extracted and a white area is not visible, such as the chipped remains of an asphalt joint or a tile, for example, are no longer erroneously sensed as white line feature amounts.

Once all feature points are extracted, processing to remove feature points that may be noise is performed in step 405. This processing is enabled by using a distribution of feature amount positions within a processing area and using the lengths of feature point segments, and the like. This processing will be described subsequently.

Generally, the relationships between the image coordinates and world coordinates can be described by means of internal parameters and external parameters of the cameras, and the conversion to world coordinates can be performed by using these camera parameters. The processing to acquire the internal parameters and external parameters of each camera is called calibration processing, and a variety of techniques have been disclosed and may be used. This calibration processing is varied and includes cases where calibration processing is only carried out only once at the time an automobile is shipped and cases where calibration processing is executed continuously in real time during travel. In the present embodiment, calibration results that are already held may be acquired, and calibration processing may be executed at all such times during travel.

White line feature amounts can be extracted by executing the foregoing processing for all the edge coordinates. Note that when there are side cameras, the X coordinates and Y coordinates must be handled in the reverse order. For example, the same processing is possible if the X and Y coordinates in the flowchart are reversed or if processing is performed with the image rotated 90 degrees.

Figure 23:
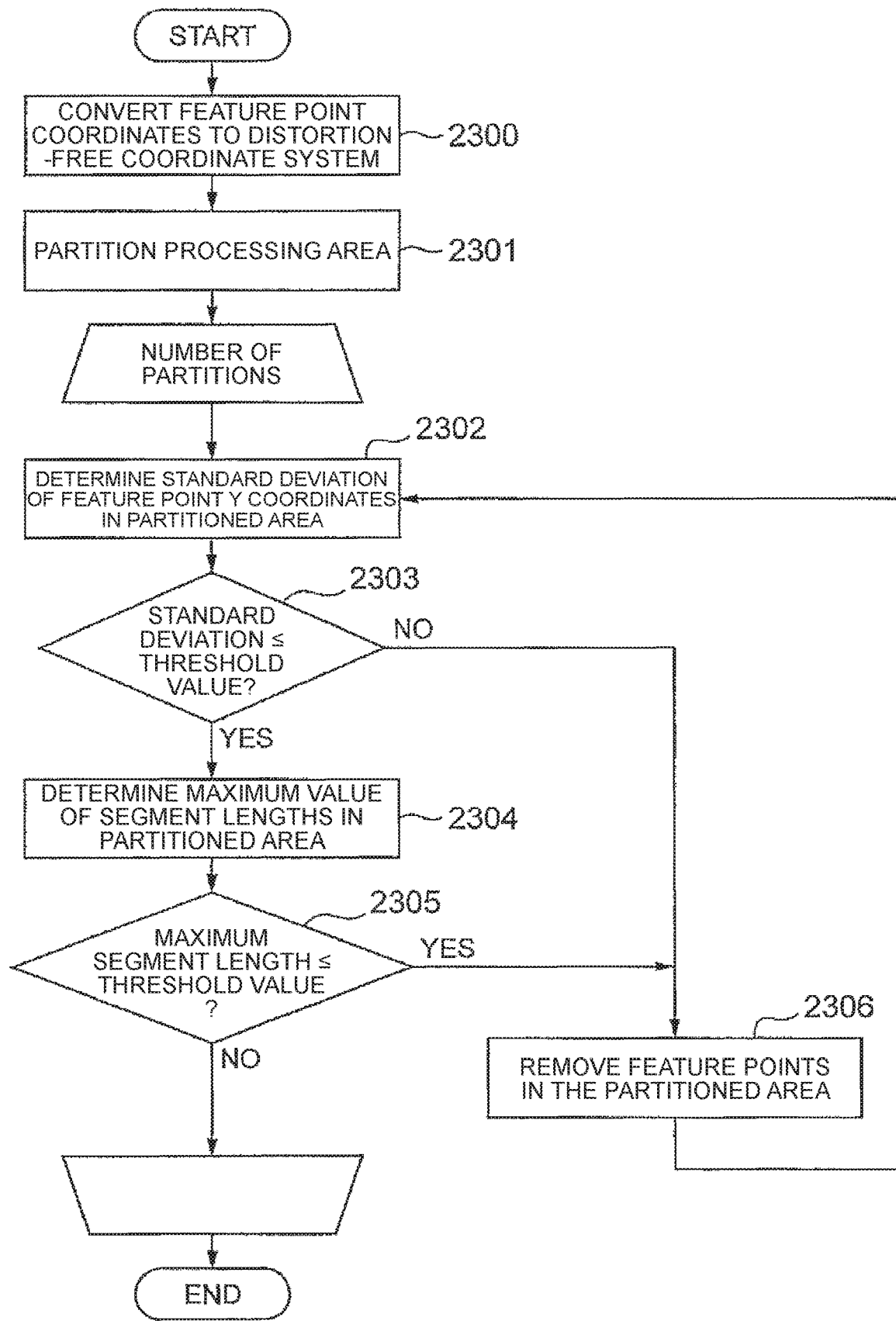
FIG. 23 is a flowchart illustrating noise removal processing.

FIG. 23 is a flowchart illustrating the feature point noise removal processing of step 405. Here, the description of the processing is based on the premise that there are side cameras. First, in step 2300, coordinates of all feature points in a captured-image processing area are converted to coordinates of a distortion-free coordinate system. Next, in step 2301, the processing area is partitioned into areas of a certain height. Thereafter, processing enters a loop corresponding to the number of partitions.

In step 2302, a standard deviation for the Y coordinates of the feature amounts in the partitioned areas is determined. Thereafter, in step 2303, the value of the Y-coordinate standard deviation is evaluated, and if the standard deviation is greater than a threshold value, the likelihood of noise is assumed to be high and all the feature points in the relevant partitioned areas are removed in step 2306. In the case of side cameras, because white lines are reflected substantially horizontally, the likelihood of noise is high if the Y-coordinate standard deviation is large.

If the standard deviation lies within the threshold values in step 2303, the maximum value of the lengths of the feature point segments (the segment length maximum value) in a partitioned area is determined in step 2304. In the present embodiment, a set of feature points at or less than a fixed interval from each other is created and, by taking the lengths thereof in the X direction as the segment lengths, the maximum value of these lengths is determined. Thereafter, in step 2305, the maximum value of the segment lengths is evaluated, and if the maximum value is equal to or less than a threshold value (segment length maximum value s threshold value), the likelihood of noise is determined to be high and all the feature points in the partitioned area are removed in step 2306. If a white line is reflected, the segment length should be equal to or greater than a fixed length, and if the segment length is short, the likelihood of noise is high.

Figure 24:
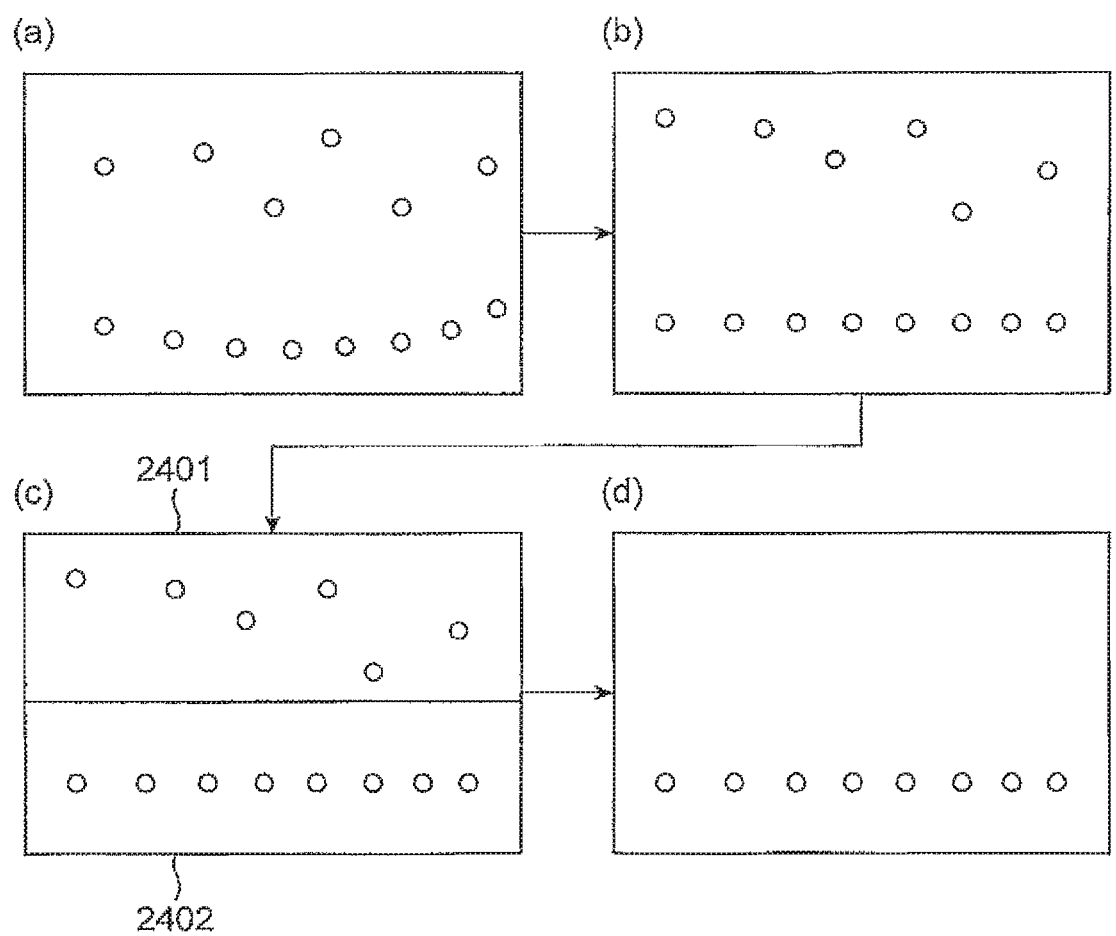
FIG. 24 is a diagram illustrating a case example of noise removal.

FIG. 24 is a diagram illustrating a case example of feature-point noise removal. FIG. 24A is a diagram illustrating an aspect of a distribution of feature points extracted from a distorted image. FIG. 24B is a diagram illustrating the results of converting the feature point coordinates of FIG. 24A to a distortion-free coordinate system, in the processing of step 2300. FIG. 24C is a diagram illustrating the results of partitioning the processing area into areas of a certain height in the processing of step 2301.

Although the image captured by a side camera is partitioned into two areas 2401 and 2402 in the present embodiment, the number of partitions may be optionally decided. Although area 2401 is disposed with feature-point positions in the Y direction distributed randomly, in area 2402, feature point positions in the Y direction are organized substantially within a certain range. When the processing of step 2302 and subsequent steps is applied to his data, as illustrated in FIG. 24D, feature points for which the likelihood of noise is high are all removed from area 2401, and feature points are left to remain in area 2402. Thus, noise can be removed on the basis of the status of the feature point distribution.

FIG. 5 is a flowchart illustrating white line candidate extraction processing after feature point extraction in the line type determination unit 201. First, in step 501, feature points which have been converted to common coordinates are projected onto a common-coordinate X axis. Thereafter, in step 502, cumulative values of the projected feature amounts are aggregated at each of the X coordinates. The feature amounts are values that can be replaced with pixel values or luminance values, and the X axis is scanned to accumulate these values. In step 503, the X coordinate for which the cumulative value is a local maximum and equal to or greater than a threshold value is extracted.

Figure 6:
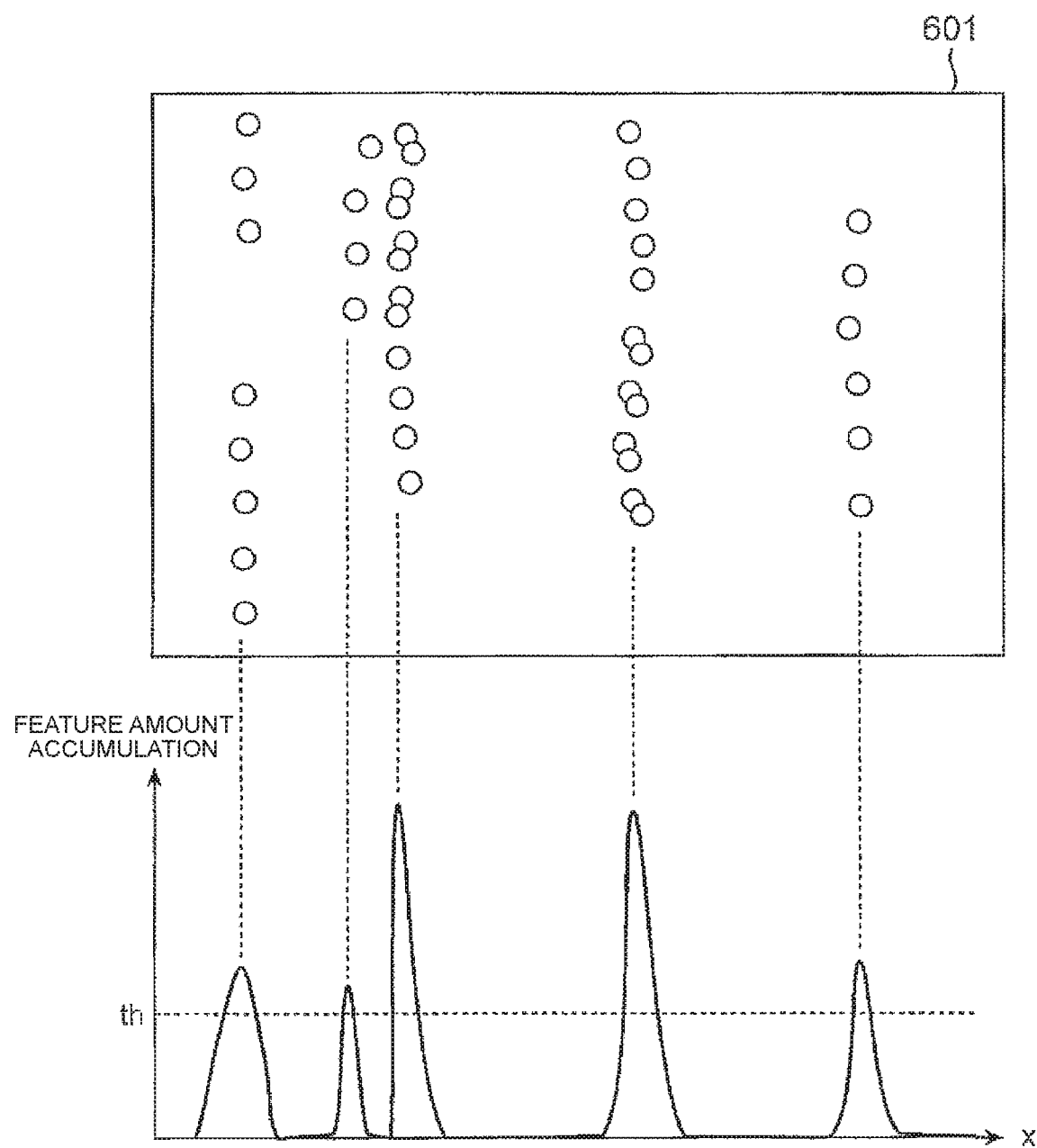
FIG. 6 is a conceptual diagram of white line candidate extraction processing.

The processing thus far is represented conceptually in FIG. 6. FIG. 6 is a conceptual diagram of white line candidate extraction processing and illustrates the concept of aggregation. The feature points of conversion results 601 are each projected onto X coordinates, the cumulative values of the feature amounts at each of the X coordinates are represented as a histogram, and the X coordinate for which the value is a local maximum is detected. Among these values, it is assumed that a white line is likely to be present at an X coordinate where the cumulative value exceeds a threshold value th and it is assumed that a white line is not present at an X coordinate where the cumulative value does not exceed the threshold value th. In other words, roughly linear candidates are first located and then the reliability of feature points among the respective local maximum X coordinates is determined.

The processing then enters a loop of the local maximum X coordinates detected hereinabove. In step 504, the numbers of feature points at the X coordinates are counted. In step 505, the number of feature points thus counted is evaluated, and if this number is equal to or greater than the threshold value, the X coordinate is saved in step 506.

Once the loop of local maximum X coordinates ends, the X coordinate with the maximum score among the X coordinates saved in step 506 is determined and the X coordinate is determined as the white line candidate position (step 507).

Furthermore, a technique other than that illustrated in FIG. 5, such as trimetric projection, may be employed. This technique involves projecting feature points onto the respective coordinate axes while changing the angle of the coordinate axes by a certain width and aggregating edge intensity cumulative values. Further, a white line candidate can be sensed by determining the angle and position at which the edge intensity is maximum.

Figure 7:
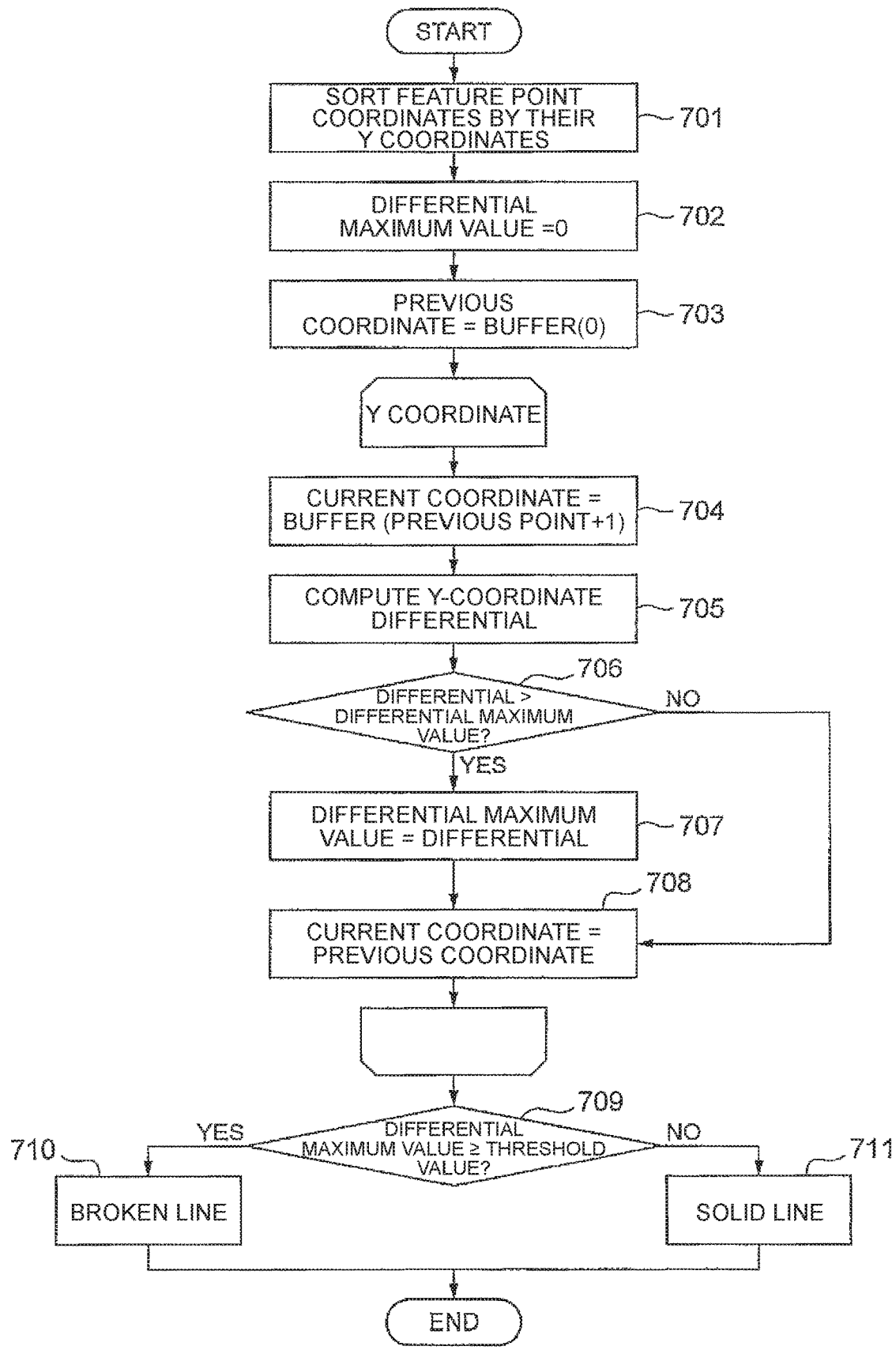
FIG. 7 is a flowchart of line type determination processing.

FIG. 7 is a flowchart of the line type determination processing in step 304. This processing makes use of the fact that there are intervals in white lines when demarcation lines are broken lines, and that white lines are drawn continuously when demarcation lines are solid lines. First, in step 701, feature point coordinates are sorted by their Y coordinates. Thereafter, variables are initialized in steps 702 and 703.

Next, the processing enters a Y coordinate loop, and in step 704, one feature point coordinate is read and the Y-coordinate differential from the previous feature point is computed. The differential is compared with a maximum differential value (step 705), and if the differential is equal to or greater than the maximum differential value, an update in which the differential is used as the maximum differential value is performed (step 706). The next feature point coordinate is then read (step 707) and the processing is repeated.

Once the processing for all the feature points is complete, the maximum differential value is compared with the threshold value in step 709, and if the maximum differential value is equal to or greater than the threshold value, a broken line is determined (step 710), and if the maximum differential value is smaller than the threshold value, a solid line is assumed (step 711).

In addition, as a technique for determining line types other than that illustrated in FIG. 7, a technique that uses the periodicity of the presence or absence of white lines in each frame is also suitable.

Figure 8:
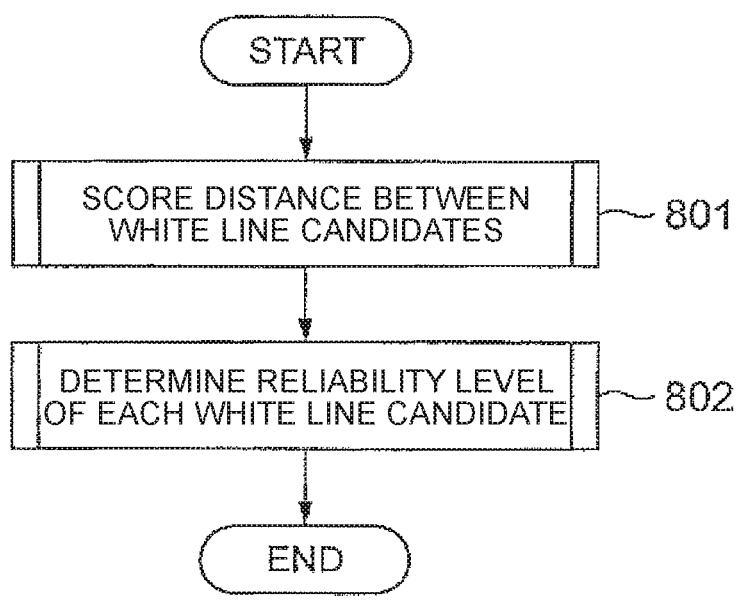
FIG. 8 is a flowchart of processing to select a highly reliable white line candidate.

FIG. 8 is a flowchart of the processing to select a highly reliable white line candidate in step 306. First, in step 801, the distances of the white line candidates extracted by each camera are scored. The reliability level of each white line candidate is then determined using these scores and white line candidates having a reliability level equal to or greater than the threshold value are kept (step 802). The processing of steps 801 and 802 will be described further using the drawings.

Figure 9:
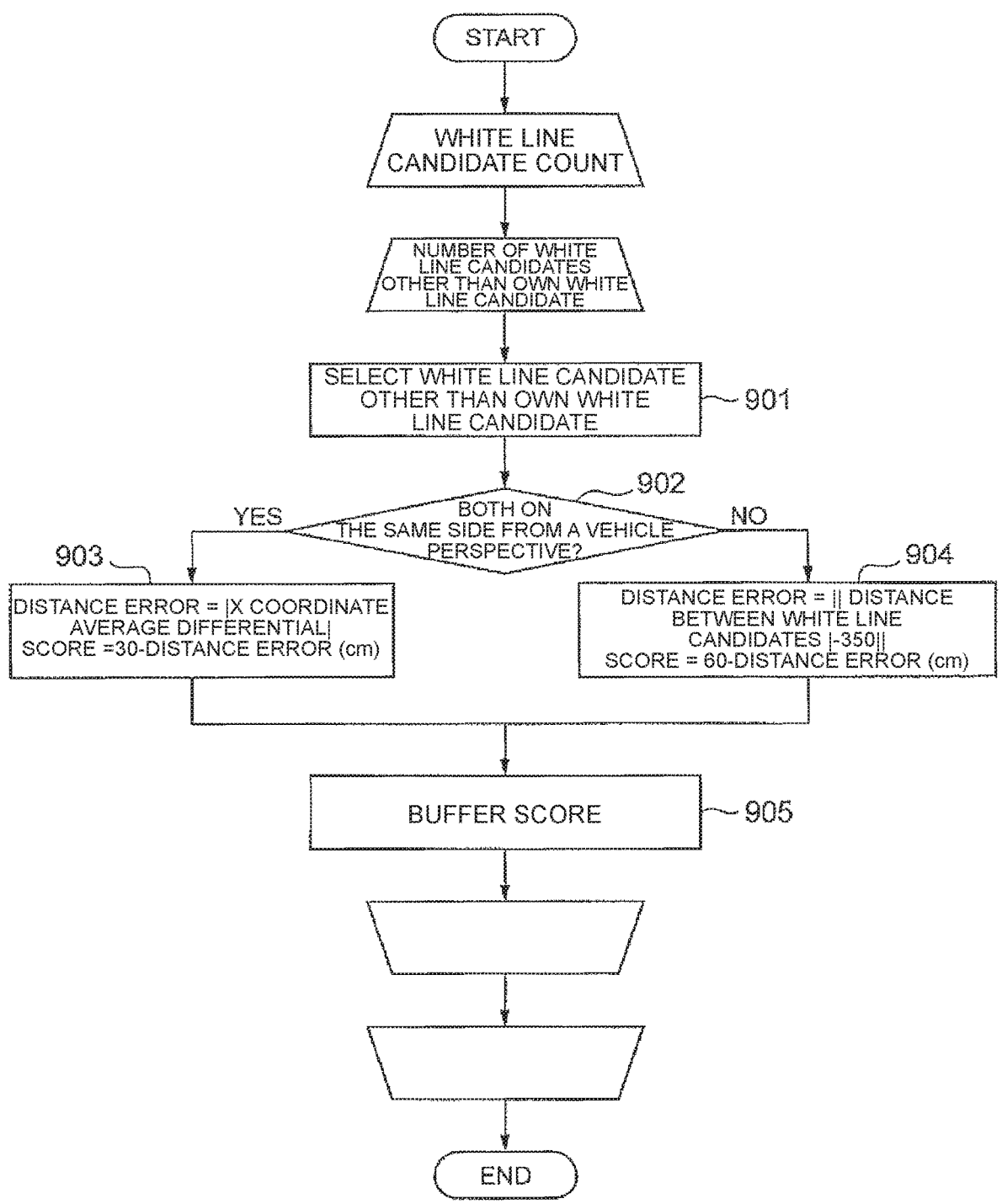
FIG. 9 is a flowchart of scoring processing.

FIG. 9 is a flowchart of the scoring processing in step 801 of FIG. 8.

First, in step 901, a white line candidate other than an own white line candidate is selected. That is, this means that the relationship between the own white line candidate and the selected white line candidate is scored. In other words, the relationship between the white line candidate (own white line candidate) selected as a reference from among a plurality of white line candidates, and another white line candidate (a white line candidate other than the own white line candidate) is scored. It is determined whether both white line candidates (the own white line candidate and the white line candidate other than the own white line candidate) are on the same side (the right side or the left side) from a vehicle perspective (step 902). When both white line candidates are on the same side, the score is computed according to step 903. That is, a value obtained by subtracting the distance between the own white line candidate (a first demarcation line candidate) and the white line candidate other than the own white line candidate (a second demarcation line candidate) from 30 cm (a first threshold value) is used as a local score. This means that, when the white line candidates are on the same side, if the distance differential is 30 cm or less, the white line candidates are regarded as the same white line. Further, the score is configured to be positive if the distance differential is 30 cm or less.

Meanwhile, when the white line candidates are on opposite sides from each other, that is, when the own white line candidate and the white line candidate other than the own white line candidate are spaced apart on the left and right sides of the vehicle, respectively, the score is computed according to step 904. If the white line candidates are on opposite sides from each other, the distance between the white line candidates should be equivalent to the lane width. Therefore, a distance error is the differential between the distance between white line candidates and the lane width. The score is then obtained by subtracting the distance error from 60 cm. That is, a value, which is obtained by subtracting the differential between the distance between the own white line candidate (the first demarcation line candidate) and the white line candidate other than the own white line candidate (the second demarcation line candidate), and the lane width from 60 cm, is used as the local score. If the distance differential is 30 cm or less when the white line candidates are on the same side, the white line candidates are regarded as the same white line, and therefore if the white line candidates are on opposite sides from each other and the distance differential is 60 cm or less, which is two times the distance, this is adopted as the positional relationship. Further, the score is configured to be positive when the distance differential is 60 cm or less. After computing the score, the score is buffered in step 905. This processing is looped through a number of times corresponding to the number of white line candidates other than the own white line candidate and is executed for all the white line candidates by being iterated a number of times corresponding to the number of white line candidates.

However, the value 30 cm or 60 cm used in FIG. 8 is a value used to illustrate the present embodiment and must be suitably adjusted at the time of implementation.

Figure 10:
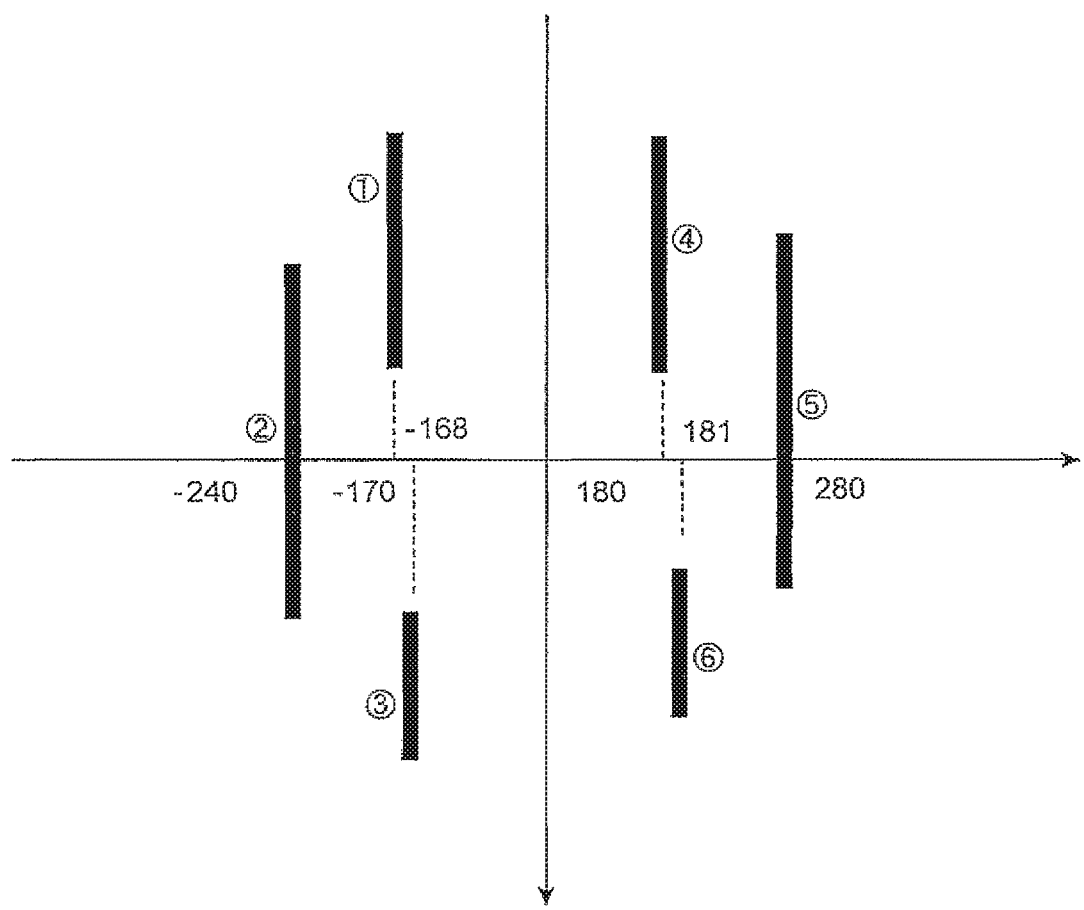
FIG. 10 is an example of positional relationships between white line candidates.

The scoring processing of step 801 will be described by assuming the positional relationships of FIG. 10. FIG. 10 is a diagram illustrating a case example of the respective positions of white line candidates and illustrates an example of positional relationships between white line candidates. (1) to (6) in FIG. 10 are white line candidates that are located on the front left, right side, rear left, front right, right side, and rear right, respectively. Where the positional relationships between the white line candidates are concerned, the relative distance error between two white lines is defined as indicated in steps 803 and 804 of FIG. 8, and a score is calculated for combinations of all the white lines. In FIG. 9, the coordinate system is a world coordinate system that uses the center of the vehicle as its starting point. Note that the units used are centimeters and that the X coordinates of the white line candidates (1) to (6) are −170, −240, −168, 180, 280, and 181, respectively.

A case where the relationship between (1) and (2) is scored may be considered, for example. The distance error is |−170−(−240)|=70, and hence the score is 30−70=−40. Furthermore, when the relationship between (1) and (4) is scored, the distance error is ||(−170−180)|−350|=0, and the score is 60−0=60. When this computation is executed for combinations of all segments (1) to (6), data like data 1101 in FIG. 11 is generated. FIG. 11 is a diagram illustrating a scoring case example.

Here, the description is provided by assuming a lane width of 350 cm, whereas, in reality, the lane width varies according to the road. In order to deal with different lane widths, the type of road being traveled on is preferably obtained from a car navigation system, for example, and a lane width commensurate with this road type is preferably configured. Alternatively, the lane width of the road being traveled may be obtained from the car navigation system.

FIG. 12 is a table illustrating an example of demarcation line information categorized by road type, which illustrates the relationships between road types and road widths corresponding to the road types. Road-categorized demarcation line information 1201 is information which is obtained from map data used by the car navigation system and is data which is stored in the storage device 103 as text data or a database, for example. Note that the road types and road widths illustrated in the road-categorized demarcation line information 1201, and broken line spacing are an example and that the present invention is not limited to or by such an example. Lane widths can be obtained by referring to this kind of data.

Figure 13:
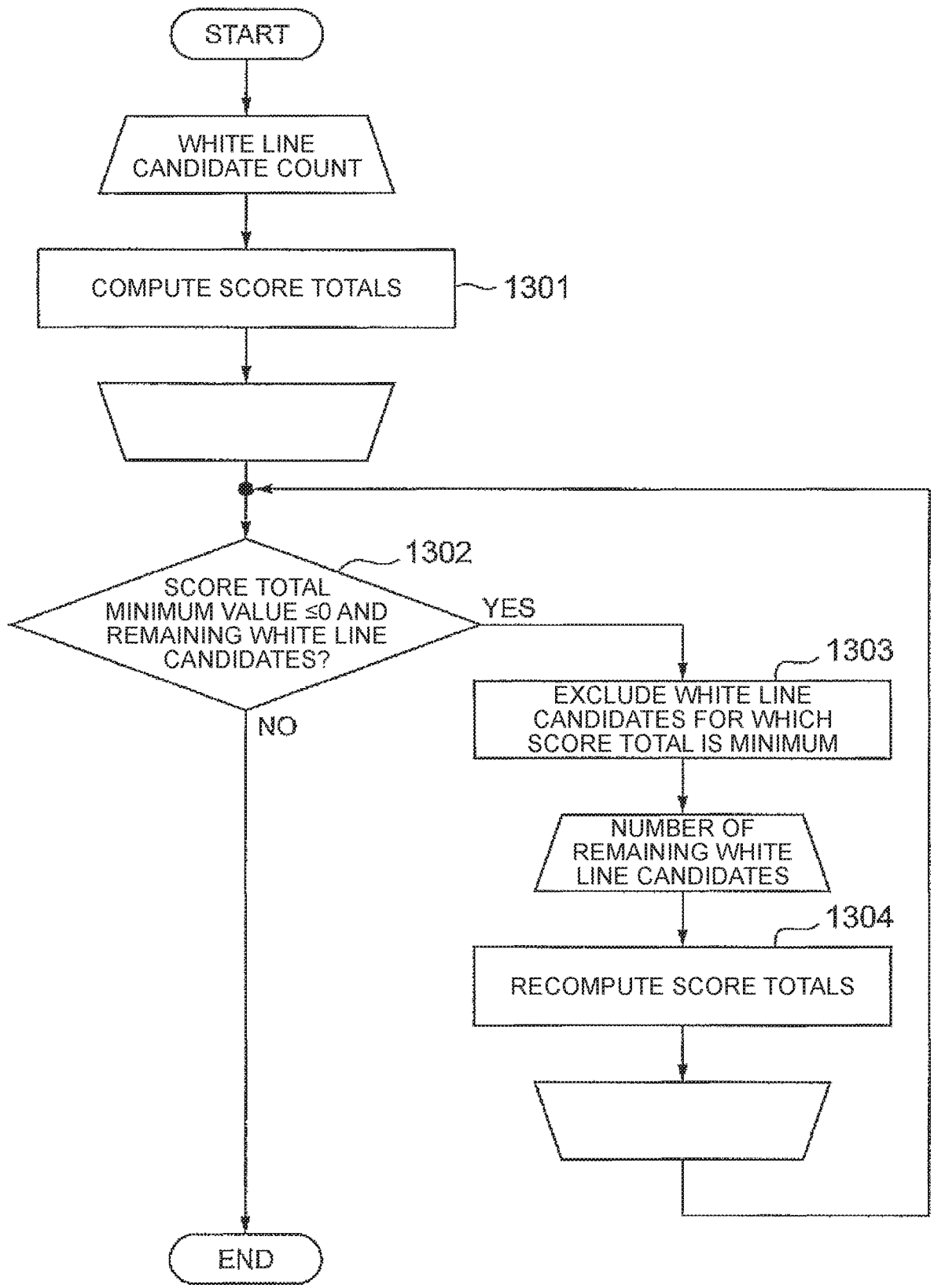
FIG. 13 is a flowchart of reliability level determination processing.

The content of the flow of reliability level determination processing in step 802 will be described next using FIG. 13.

First, score totals are computed for all the white line candidates (step 1301). Thereafter, in step 1302, it is determined whether or not the minimum value of the score totals is 0 or less. It is also determined whether or not any white line candidates, which are evaluation targets, still remain. If the results of both the foregoing determinations are Yes (when the minimum value of the score totals is 0 or less and evaluation-target white line candidates still remain), the processing moves to step 1303 and the white line candidates for which the score total is minimum are excluded. The score totals are then recomputed by taking the remaining white line candidates as targets (step 1304). When recomputing the score totals, the recomputation is executed by leaving out the scores of the excluded white line candidates. Thereafter, the processing returns to step 1302, whereupon the same determinations are executed. Further, if either of the determination conditions is No, that is, if the minimum value of the score totals is greater than 0 or there are no remaining evaluation-target white line candidates, the processing is ended (End), and if the conditions are Yes, the processing of the foregoing step 1303 and subsequent steps is repeated.

FIG. 14 is a diagram illustrating a case example of reliability level determination. An aspect in which the reliability level determination of step 802 is applied to data 1101 of FIG. 11 will now be described using FIG. 14. The results of the processing of step 1301 are as per data 1401. Thereafter, the minimum value of the score total values is determined in step 1302. Here, the score −297 of white line candidate (5) is a value that is minimum and negative. Therefore, the processing advances to step 1303 and white line candidate (5) is excluded, and the score totals are recomputed in step 1304. The result is data 1402.

The processing then returns to step 1302, whereupon the score minimum value is determined. At such time, the score −103 of white line candidate (2) is a value that is minimum and negative. Therefore, the processing advances to step 1303 and white line candidate (2) is excluded, and the score totals are recomputed in step 1304. The result is data 1403.

The processing then returns to step 1302 and, upon determining a score minimum value, because the score is positive for all the remaining white line candidates, the processing ends here. As a result, the white line candidates considered to have been sensed erroneously are (2) and (5), and a line type determination is carried out using the remaining white line candidates (1), (3), (4), and (6).

Figure 15:
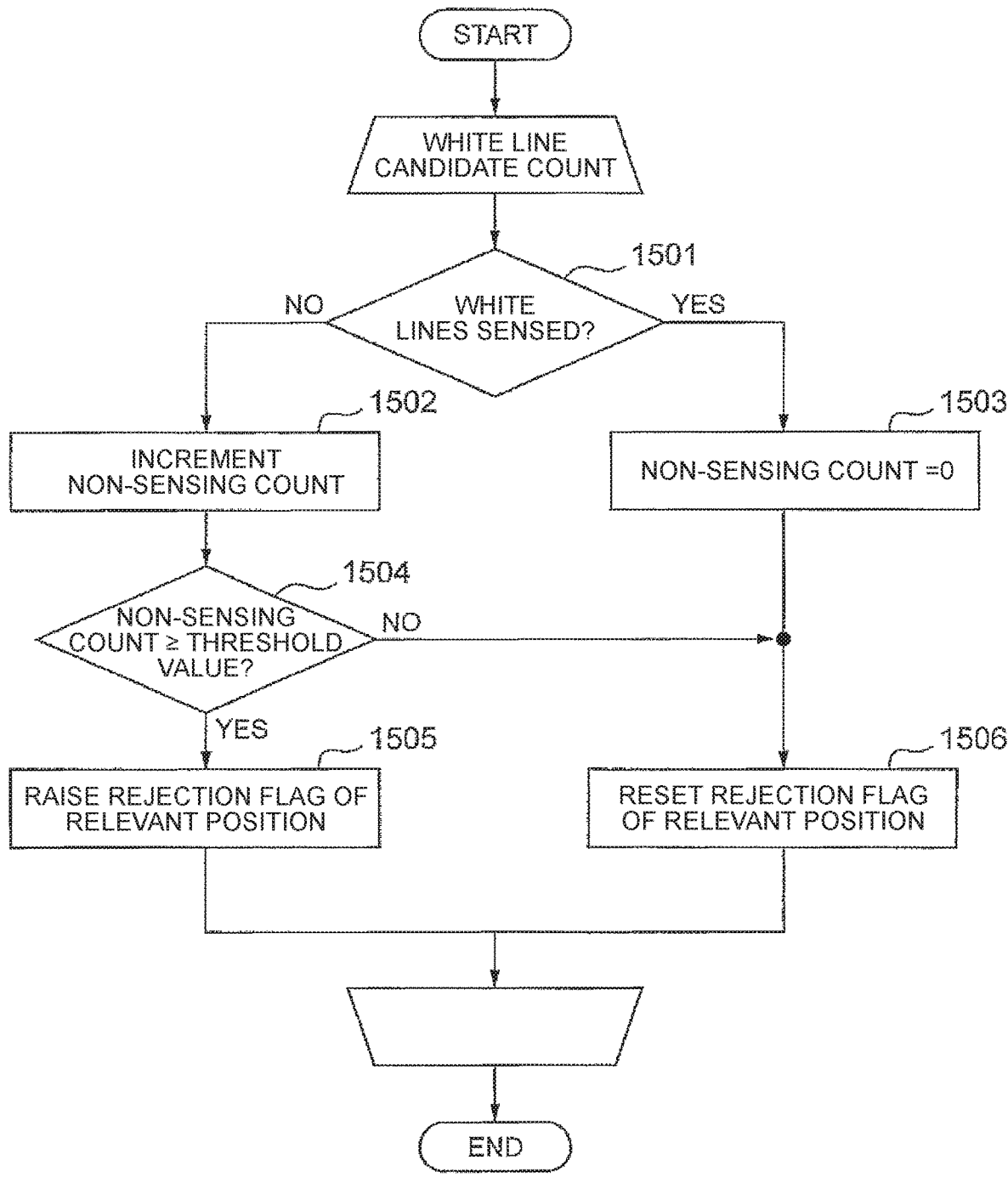
FIG. 15 is a flowchart of reliability level determination processing.

FIG. 15 is an example of the reliability level determination of step 802. In cases where white line candidates in the same positions have been continuously sensed, the white line candidates in these positions are rejected and the determination is carried out a number of times corresponding to the number of positions where white line candidates are sensed (a maximum of six in the present embodiment).

Step 1501 is processing to determine whether or not white line candidates have been sensed. This processing does not involve simply determining whether or not white lines have been sensed in images, rather, the flow of processing in FIG. 13 also includes a determination of whether or not erroneous sensing has been determined. In the case of the example in FIG. 10, it is determined that white line candidates (2) and (5) have not been sensed, and it is determined that white line candidates other than white line candidates (2) and (5) have been sensed.

When these white line candidates have not been sensed, the non-sensing count is incremented in step 1502. Further, the non-sensing count is evaluated in step 1504, and if this count is equal to or greater than a threshold value, in step 1505 a rejection flag is raised for the white line candidates in the relevant positions. When these white line candidates have been sensed, the non-sensing count is reset to zero in step 1503, and the rejection flag for the relevant positions is reset in step 1506.

By executing this processing, even when non-sensing of white line candidates or erroneous recognition has occurred, an erroneous determination of line type can be prevented by means of such data.

Figure 16:
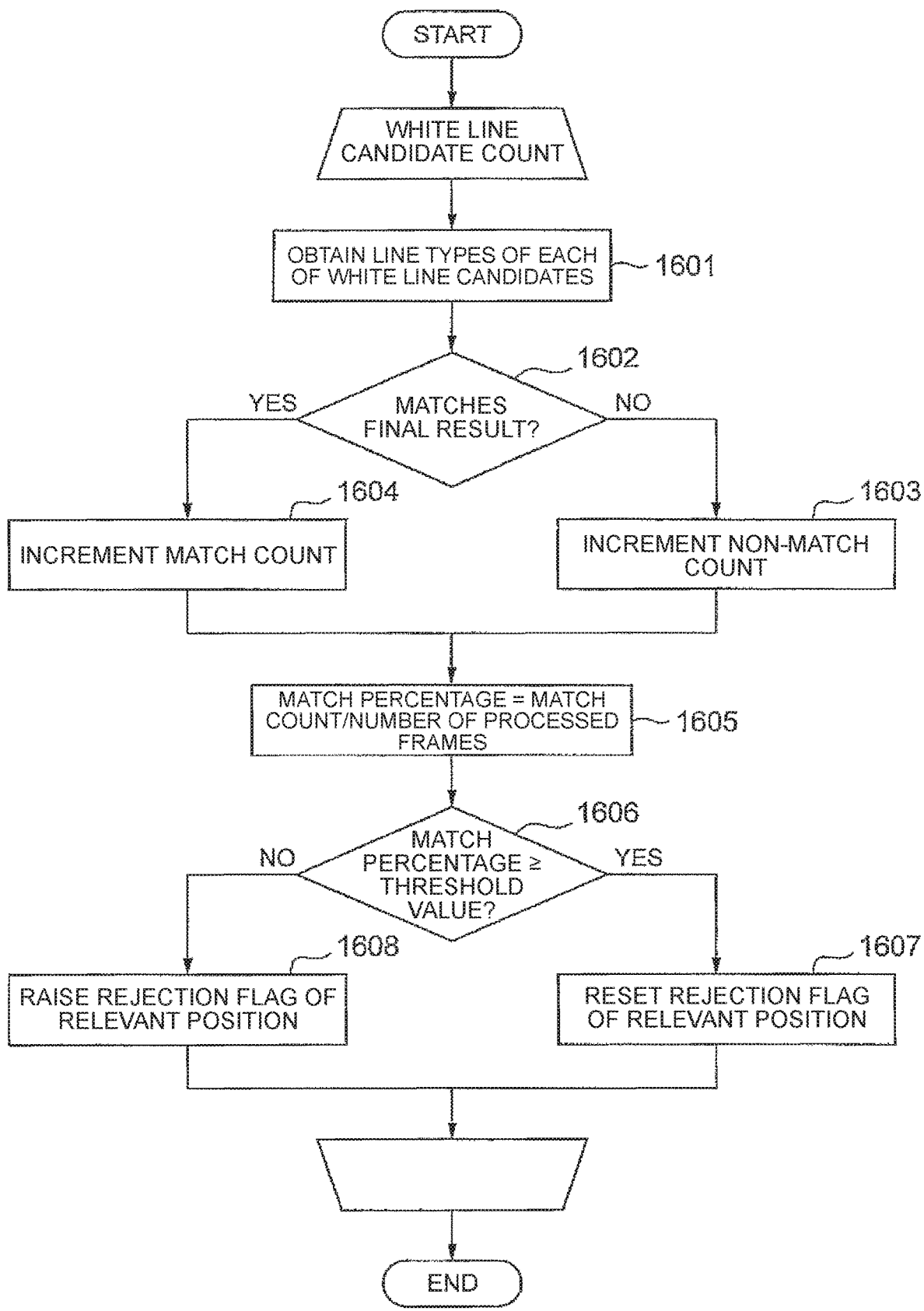
FIG. 16 is a flowchart of reliability level determination processing.

FIG. 16 is an example of the reliability level determination of step 802. This involves determining the reliability level by means of a match percentage between the final line type and the line type of each white line candidate. First, the line type of each sensed white line candidate is obtained in step 1601. Next, this line type is compared with the final line type result in step 1602. If the line types match, a match count is incremented in step 1604, and if the line types do not match, a non-match count is incremented in step 1603.

The match percentage is then determined in step 1605. This determination involves dividing the match count by the number of frames processed thus far (match count/number of processed frames). However, the target data for computing the match percentage need not be all the data from the system route to the current frame, rather, the results of the latest 100 frames may be used as a target or the data following a lane change may be used as a target, for example. Thereafter, the match percentage is evaluated in step 1606, and if the match percentage is equal to or greater than a threshold value, a rejection flag is raised in step 1608. If the match percentage is less than the threshold value, the non-rejection flag for the position is reset in step 1607.

By executing this processing, white line candidates for which the line type determination result is unreliable are excluded, and line types can be determined without affecting the relevant data.

Figure 17:
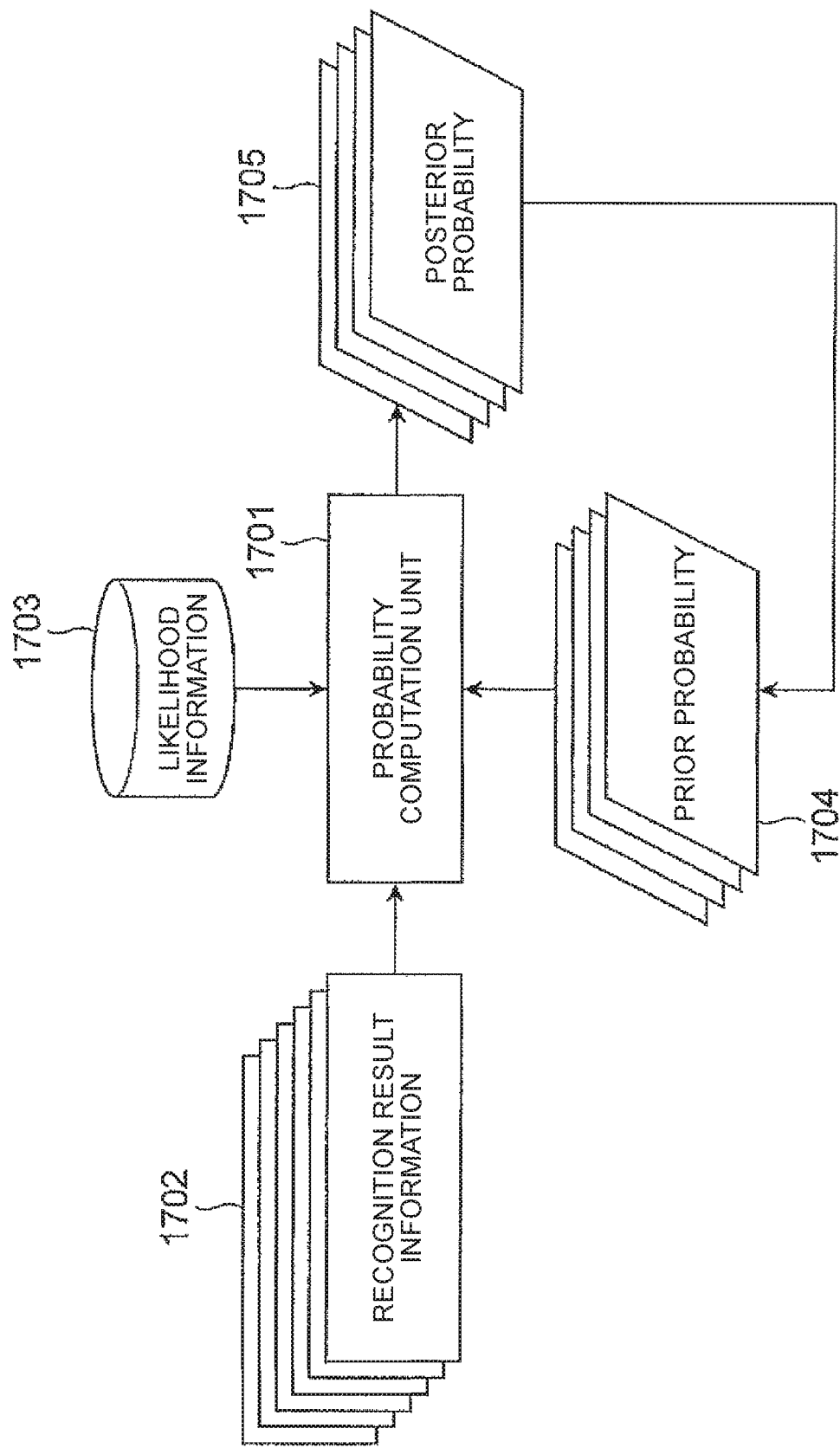
FIG. 17 is a diagram of a software configuration of a line type probability calculation unit.

FIG. 17 is a diagram illustrating a software configuration of the line type probability calculation unit 204. Here, a probability computation method will be described based on the assumption that Bayes' theorem is used. However, Bayes' theorem is merely one embodiment aspect and other methods may also be used.

Recognition results information 1702 are line types, non-rejection flags, and match percentages, and the like. A probability computation unit 1701 is configured to not use information of white line candidates for which a rejection flag has been raised and for which the match percentage is less than the threshold value and computes the probability of the presence of each line type by using information other than this information.

Likelihood information 1703 is values indicating the probability of determining the presence of each line type in a case where a certain line type is present, and values measured in advance may be stored. There is no problem with entering a suitable value as an initial value for a prior probability 1704. For example, if the line types constituting recognition targets are a solid line and a broken line, the initial value for the prior probability of each line type may be set at 0.5, and if there are three types of recognition-target line types, the initial value of each may be set at 0.33.

The probability computation unit 1701 uses the recognition results information 1702, the likelihood information 1703, and the prior probability 1704 to output a posterior probability 1705 for each recognition-target line type. More specifically, the following formula is used to calculate the probability of the presence of each line type. Although the recognition-target line types are described as a solid line and a broken line in the following equation, the probability of the presence of each line type may also be calculated using a similar formula even when other line types are added. The posterior probability 1705 is a probability for the presence of each line type which is to be determined in the respective frames. The posterior probability 1705 is then the prior probability 1704 at the time of processing the next frame.

$$P(H_1 | D_f, D_s, D_r) = \frac{P(D_f | H_1)P(D_s | H_1)P(D_r | H_1)P(H_1)}{\sum_i P(D_f | H_1)P(D_s | H_1)P(D_r | H_1)P(H_1)} \quad [\text{Math 1}]$$

Figure 18:
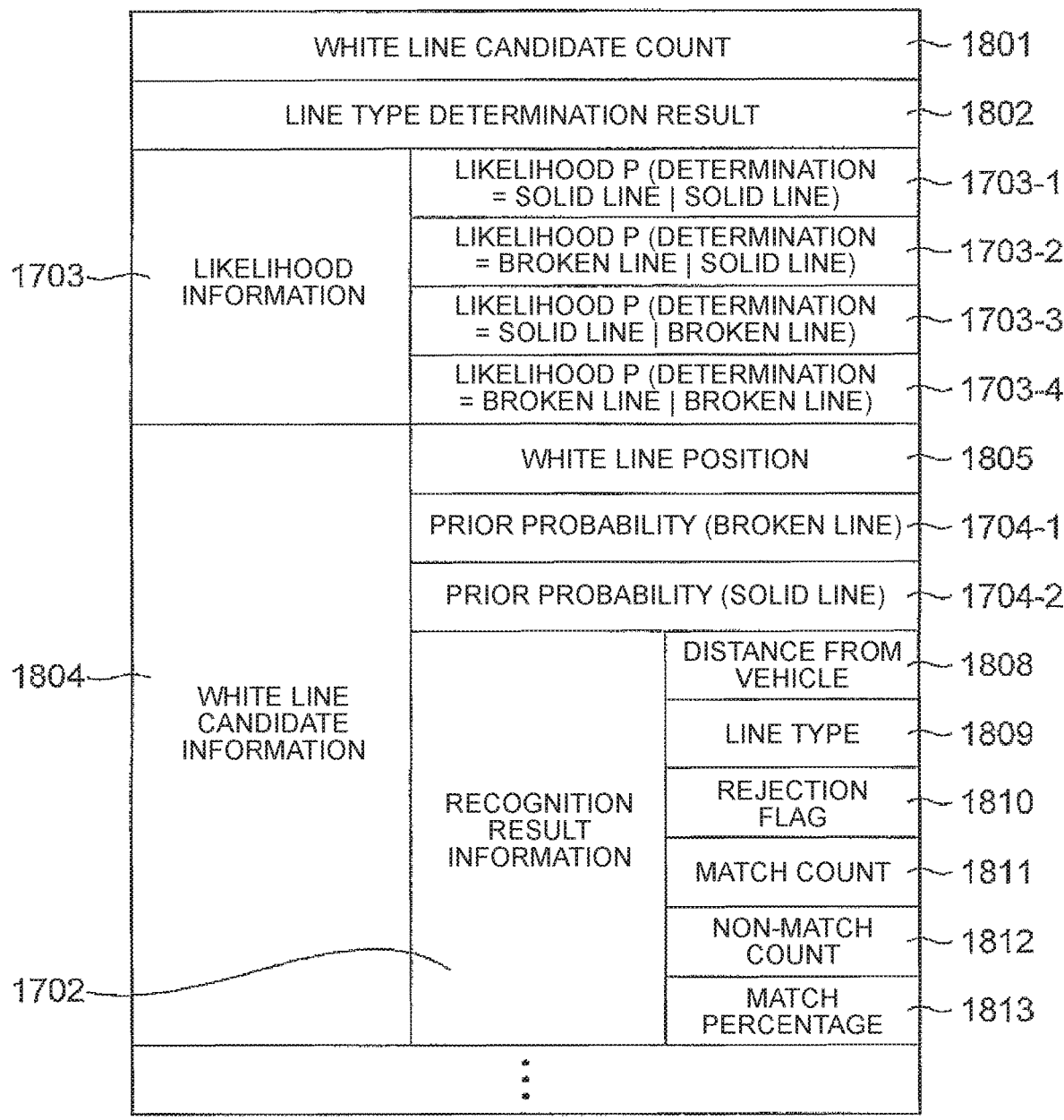
FIG. 18 is an internal data structure.

$H_0$: broken line is the solution
$H_1$: solid line is solution
$D_f$: line type determination result (front camera)
$D_s$: line type determination result (side camera)
$D_r$: line type determination result (rear camera)
$P(H_1|D_f, D_s, D_r)$: posterior probability
$P(D_f|H_1)$: likelihood (front camera)
$P(D_s|H_1)$: likelihood (side camera)
$P(D_r|H_1)$: likelihood (rear camera)
$P(H_1)$: prior probability FIG. 18 is the internal structure of the data required to calculate the presence probability of each line type. A white line candidate count 1801 is the number of white line candidates and is six in the present embodiment. A line type determination result 1802 is the final line type determination result in the respective frame. That is, this is the result finally determined by using the posterior probability 1705. The likelihood information 1703 is the likelihood of each line type constituting a recognition target and is as detailed earlier. FIG. 18 illustrates an example of a case where the line types constituting recognition targets are a solid line and a broken line. Likelihood information 1703-1 is the probability of determining a line type as a solid line in a solid line interval, likelihood information 1703-2 is the probability of determining a line type as a broken line in a solid line interval, likelihood information 1703-3 is the probability of determining a line type as a solid line in a broken line interval, and likelihood information 1703-4 is the probability of determining a line type as a broken line in a broken line interval.

White line candidate information 1804 will be described next. The white line candidate information 1804 has a number of fields corresponding to the number indicated in the white line candidate count 1801.

A white line position 1805 indicates the positions "front right", "rear left", and so forth, for example. The prior probability 1704 is as mentioned earlier. Note that the prior probability 1704 is retained for each of the line types constituting recognition targets, and if the recognition targets are a solid line and a broken line, is retained as prior probabilities 1704-1 and 1704-2. Note that when there is an increase in recognition-target line types, these line types must also be retained.

The recognition results information 1702 is the recognition results for each of the white line candidates and exists in a quantity corresponding to the number of sensed white line candidates. A distance 1808 denotes the distance from the vehicle, and its units are in millimeters, centimeters, or meters. Note that a predefined constant is stored when non-sensing has occurred in the relevant position.

A line type 1809 is the line type of the relevant white line candidate and is a solid line or a broken line in the present embodiment, but a predefined constant is stored when non-sensing occurs.

A rejection flag 1810 is as described earlier and is a flag indicating whether or not the white line candidate information 1804 of the respective position is to be used when the line type is finally determined.

A match count 1811 is also as described earlier and is a value which is counted in step 1604. A non-match count 1812 is also similarly a value which is counted in step 1603. A match percentage 1813 is also similarly a value which is computed in step 1605.

Figure 19:
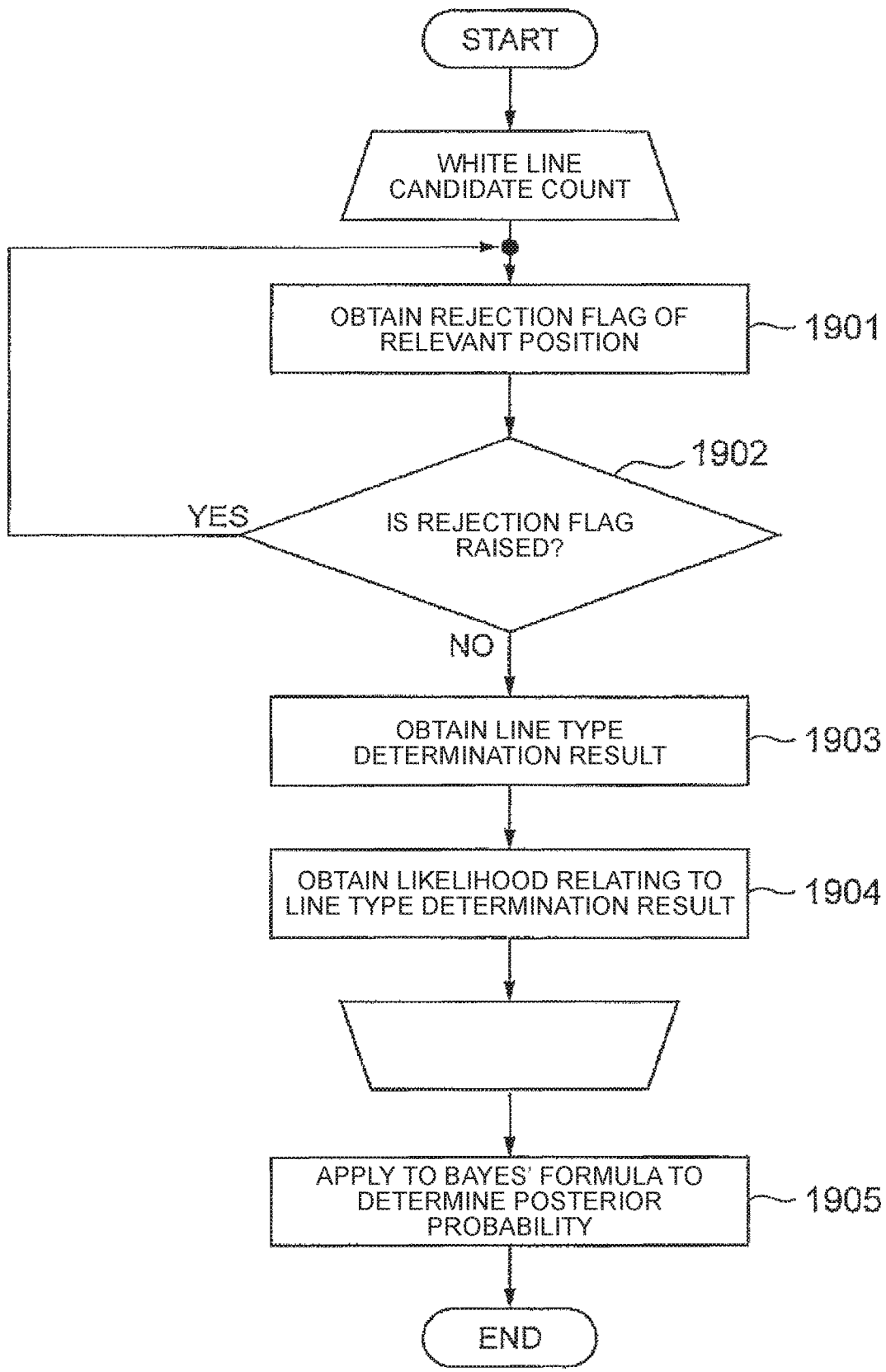
FIG. 19 is a flowchart of processing by the line type probability calculation unit.

FIG. 19 is the flow of processing by the line type probability calculation unit 204. First, in step 1901, the value of the white line candidate rejection flag is obtained. This is the value of the rejection flag 1810 in FIG. 18. In step 1902, the value of the rejection flag is evaluated, and if the rejection flag has been raised, the processing moves to processing of the next white line candidate. If the rejection flag is not raised, a line type determination result is obtained in step 1903 and a likelihood value relating to the line type determination result is obtained in step 1904. For example, if the line type determination result denotes a solid line, the likelihood values that need to be obtained are likelihood information 1703-1 and 1703-3.

The foregoing processing is executed for all the white line candidates and applied in step 1905 to the formula for Bayes' theorem indicated earlier. Thus, the presence probability can be computed for each of the line types constituting recognition targets.

Note that, although a non-sensing case is not illustrated in FIGS. 18 and 19, the probability of a white line not being present can be determined by applying Bayes' theorem formula similarly also to a non-sensing case. Likelihood information may store a likelihood value for a non-sensing case, and likelihood information for a non-sensing case may be applied to Bayes' theorem formula in step 1905.

Figure 20:
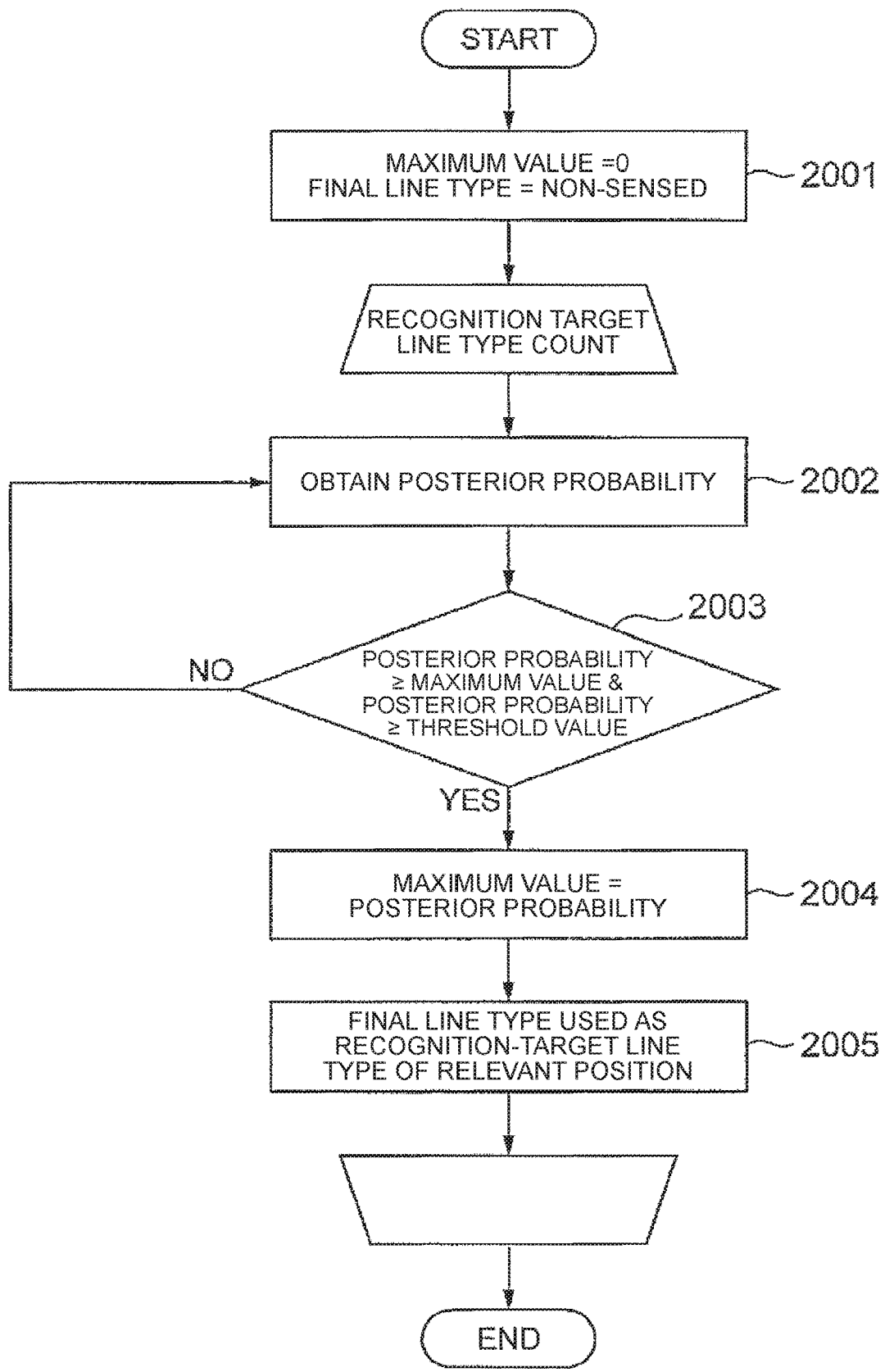
FIG. 20 is a flowchart of processing by a line type probability decision unit.

FIG. 20 is the flow of processing by the line type decision unit 205. First, variables are initialized in step 2001. The maximum value of the posterior probability is assumed to be zero and the final line type is assumed to be "non-sensing". The processing subsequently enters a loop corresponding to the number of recognition-target line types.

The posterior probability of the respective line types is obtained in step 2002. This is the posterior probability computed in step 1905. Thereafter, the posterior probability is evaluated in step 2003, and it is determined whether or not the posterior probability is equal to or greater than a maximum value and equal to or greater than a threshold value. Here, a value for determining the respective line type as the final line type is optionally decided beforehand as the threshold value, but a comparison with the threshold value is not essential. If the result is No, the respective line type is not assumed, and the processing returns to step 2002. If the result is Yes, the maximum value is replaced with the posterior probability of the respective line type, and the final line type is also replaced with the respective line type.

For the line type which is finally decided, the final line type may be referred to once the loop corresponding to the number of recognition-target line types has ended. Note that the line type may be processed as non-sensing if the maximum value remains at zero.

Figure 21:
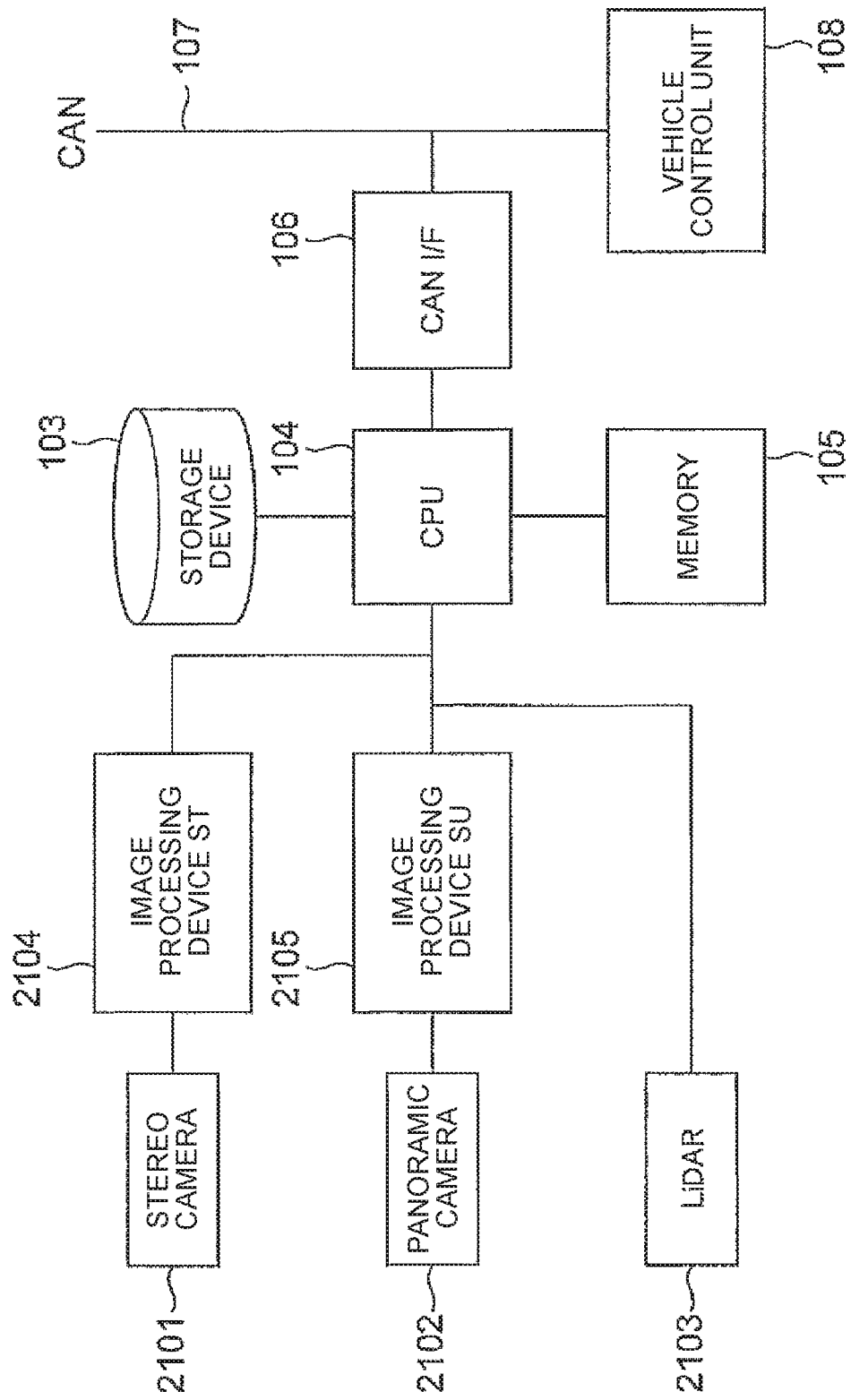
FIG. 21 is a configuration example of the device when cameras are not used.

As described above, although the line type of a white line can be determined using a plurality of cameras, the present invention may also be implemented by using sensors other than cameras. FIG. 21 is an example of such a configuration. At least any one of a stereo camera 2101, a panoramic camera 2102, and a LiDAR (laser range finder) 2103 may be installed instead of the camera 101. An image processing device 2104 is connected to the stereo camera 2101, and an image processing device 2105 is connected to the panoramic camera 2102. Note that these image processing devices may also be the same. The data of the LiDAR 2103 can be processed by the CPU 104.

Figure 22:
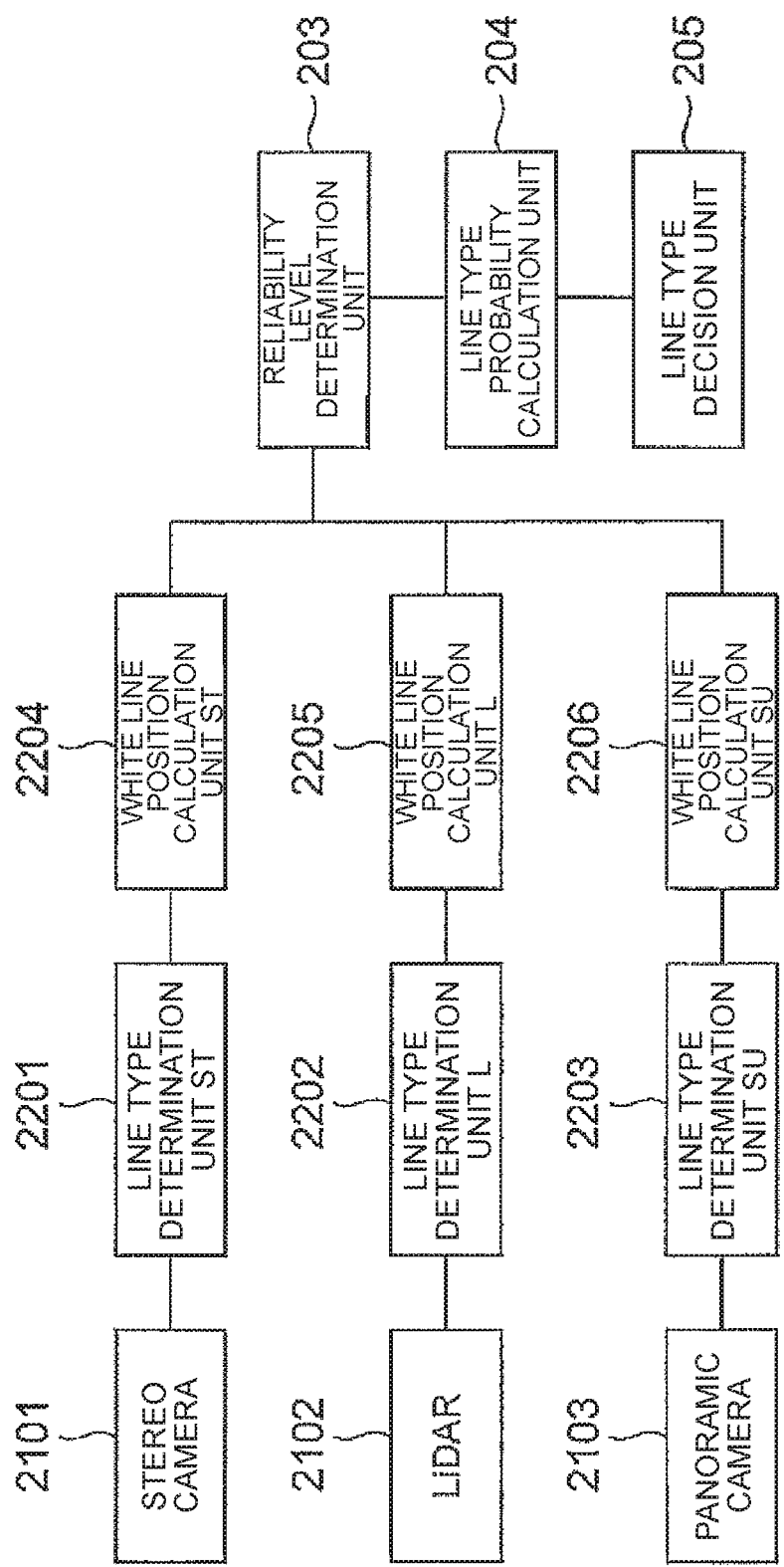
FIG. 22 is an example of the software configuration when cameras are not used.

Similarly also in this configuration, each sensor senses white line candidates and is able to determine the line types by stochastically processing the white line candidates. The software configuration is illustrated in FIG. 22. A line type determination unit 2201 senses white line candidates from the images of the stereo camera 2101 and determines the line types of the white line candidates. A white line position calculation unit 2204 calculates the distances from the vehicle to the white lines.

Similarly to the LiDAR 2102 and the panoramic camera 2103, the line type determination units 2202 and 2203 and white line position calculation units 2204 and 2205 execute the same processing, respectively. These results are processed by the reliability level determination unit 203, the line type probability calculation unit 204, and the line type decision unit 205, and the final line type is decided. Such processing is as described hereinabove.

Embodiments of the present invention have been described in detail hereinabove, but the present invention is not limited to or by the embodiments, rather, a variety of design changes can be implemented without departing from the scope of the present invention disclosed in the claims. For example, the foregoing embodiments have been described in detail in order to provide an explanation that facilitates understanding of the present invention, but the present invention is not necessarily limited to embodiments that comprise all the configurations described. Furthermore, a portion of the configuration of a certain embodiment may be replaced by the configuration of another embodiment, and the configuration of another embodiment may be added to the configuration of the certain embodiment. Moreover, a portion of the configuration of each embodiment can have other configurations added thereto or can be removed or replaced.

REFERENCE SIGNS LIST

101: Camera (sensor), 201: line type determination unit, 202: white line distance calculation unit (demarcation line distance calculation unit), 203: reliability level determination unit, 204: line type probability calculation unit (probability computation unit), 205: line type decision unit

The invention claimed is:

1. A demarcation line recognition device comprising:
a plurality of sensors;
a line type determination unit that senses demarcation line candidates from respective images obtained by the plurality of sensors and determines line types of the sensed demarcation line candidates;
a demarcation line position calculation unit that calculates positions of the sensed demarcation line candidates;
a reliability level calculation unit that computes a reliability level of each demarcation line candidate by using positional relationships between the sensed demarcation line candidates;
a probability computation unit to which line types of demarcation line candidates with a reliability level equal to or greater than a threshold value are input, wherein the probability computation unit determines a probability for each line type; and a line type decision unit that determines the line types of demarcation lines on the basis of results of the probability computation unit, wherein the reliability level calculation unit scores distances between demarcation line candidates and uses the scores to compute the reliability level of each of the demarcation line candidates, wherein
it is determined whether or not a first demarcation line candidate, which is selected as a reference from a plurality of the demarcation line candidates, and a second demarcation line candidate other than the first demarcation line candidate are on the same side from a vehicle perspective, wherein
if the first demarcation line candidate and the second demarcation line candidate are on the same side, a value obtained by subtracting, from a first threshold value, a distance between the first demarcation line candidate and the second demarcation line candidate is used as a local score, wherein
if the first demarcation line candidate and the second demarcation line candidate are on opposite sides, a value obtained by subtracting, from a second threshold value, a differential between a lane width and the distance between the first demarcation line candidate and the second demarcation line candidate is used as the local score, and wherein after the local score has been computed for respective combinations of the demarcation line candidates, a total of the local scores for each of the demarcation line candidates is used as the score to compute the reliability level of each of the demarcation line candidates.

2. The demarcation line recognition device according to claim 1, wherein the line type determination unit determines whether or not the demarcation lines are continuous or determines the line types of the demarcation line candidates on the basis of the periodicity of the presence or absence of demarcation lines in each frame.

3. The demarcation line recognition device according to claim 1, wherein the reliability level calculation unit performs the scoring based on a relationship between a demarcation line candidate which is selected as a reference from a plurality of the demarcation line candidates.

4. The demarcation line recognition device according to claim 3, wherein, when a distance differential between a demarcation line candidate which is selected as a reference from the plurality of demarcation line candidates, lies within a predetermined range, the reliability level calculation unit determines that the demarcation line candidates are the same demarcation line.

5. The demarcation line recognition device according to claim 1, wherein the reliability level calculation unit uses information other than demarcation line positions for which non-sensing has occurred a fixed number of times or more.

6. The demarcation line recognition device according to claim 1, wherein the reliability level calculation unit determines a match percentage by comparing a line type determination result which is output by each of the plurality of sensors with a line type which is output by the line type decision unit, and uses information of demarcation line positions for which the percentage is equal to or greater than a threshold value.

7. The demarcation line recognition device according to claim 1, wherein the probability calculation unit uses Bayes' theorem.

8. The demarcation line recognition device according to claim 1, wherein the sensor is a monocular camera.

9. The demarcation line recognition device according to claim 1,
wherein the sensor is at least one of a stereo camera, a laser range finder, and a panoramic camera.

* * * * *